US012732731B2

(12) United States Patent
Wong et al.

(10) Patent No.: US 12,732,731 B2
(45) Date of Patent: Sep. 8, 2026

(54) METHOD AND APPARATUS FOR HEADBAND GESTURE SENSING WITH ANALOG PRESSURE SENSOR FOR A WIRELESS HEADSET DEVICE

(71) Applicant: Dell Products, LP, Round Rock, TX (US)

(72) Inventors: Kai Leong Wong, Singapore (SG); Wong Hin Loong Justin, Singapore (SG); Manish Krishnaji Desai, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 162 days.

(21) Appl. No.: 18/377,898

(22) Filed: Oct. 9, 2023

(65) Prior Publication Data

US 2025/0119677 A1 Apr. 10, 2025

(51) Int. Cl.
*H04R 1/10* (2006.01)

(52) U.S. Cl.
CPC ......... *H04R 1/1041* (2013.01); *H04R 1/1008* (2013.01); *H04R 2420/07* (2013.01)

(58) Field of Classification Search
CPC ............................ H04R 1/1041; H04R 1/1008
See application file for complete search history.

(56) References Cited

U.S. PATENT DOCUMENTS 10,359,806 B2 7/2019 Osman
10,845,845 B2 11/2020 Osman
11,509,988 B1 * 11/2022 Justin ..................... H04R 1/105
2010/0040245 A1 2/2010 Buil
2017/0276943 A1 9/2017 Osman
2017/0277254 A1 9/2017 Osman
2017/0280223 A1 * 9/2017 Cavarra ................ G06F 1/1694
2020/0174558 A1 6/2020 Gui
2022/0264467 A1 * 8/2022 Zhao ................ H04W 52/0235

FOREIGN PATENT DOCUMENTS

WO 2007/141769 A2 12/2007
WO 2015/036458 A1 3/2015
WO 2015/067016 A1 5/2015
WO 2021/120331 A1 6/2021

* cited by examiner

*Primary Examiner* — Fan S Tsang
(74) *Attorney, Agent, or Firm* — Prol Intellectual Property Law, PLLC; H. Kenneth Prol

(57) ABSTRACT

A wireless headset includes a microcontroller and a first earpiece and a second earpiece to provide audio output to a user. The wireless headset includes a flexible headband coupled to the first earpiece and second earpiece and a headband profile state sensor. The headband profile state sensor detects when the headset is in a headset un-worn headband gesture state and a worn headband gesture state by detecting a change in resistance value at a headband profile state sensor when a distance between the earpieces is increased and decreased thereby flexing the headband. A headband state circuit includes a comparator to detect a change in the resistance at the headband profile state sensor. The headband state circuit may be dynamically adjusted via bias gain used to ensure the headband state circuit is able to detect transitions between the headset un-worn headband gesture state and the headset worn headband gesture state.

20 Claims, 10 Drawing Sheets

METHOD AND APPARATUS FOR HEADBAND GESTURE SENSING WITH ANALOG PRESSURE SENSOR FOR A WIRELESS HEADSET DEVICE

FIELD OF THE DISCLOSURE

The present disclosure generally relates to a wireless headset used to transmit audio data to and from an information handling system. More specifically, the present disclosure relates to a wireless headset that detects whether the headset is worn, unworn, or being pried apart.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may be operatively coupled, wirelessly, to a wireless headset used to receive audio input from and provide audio output to the user of the headset.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

Figure 6:
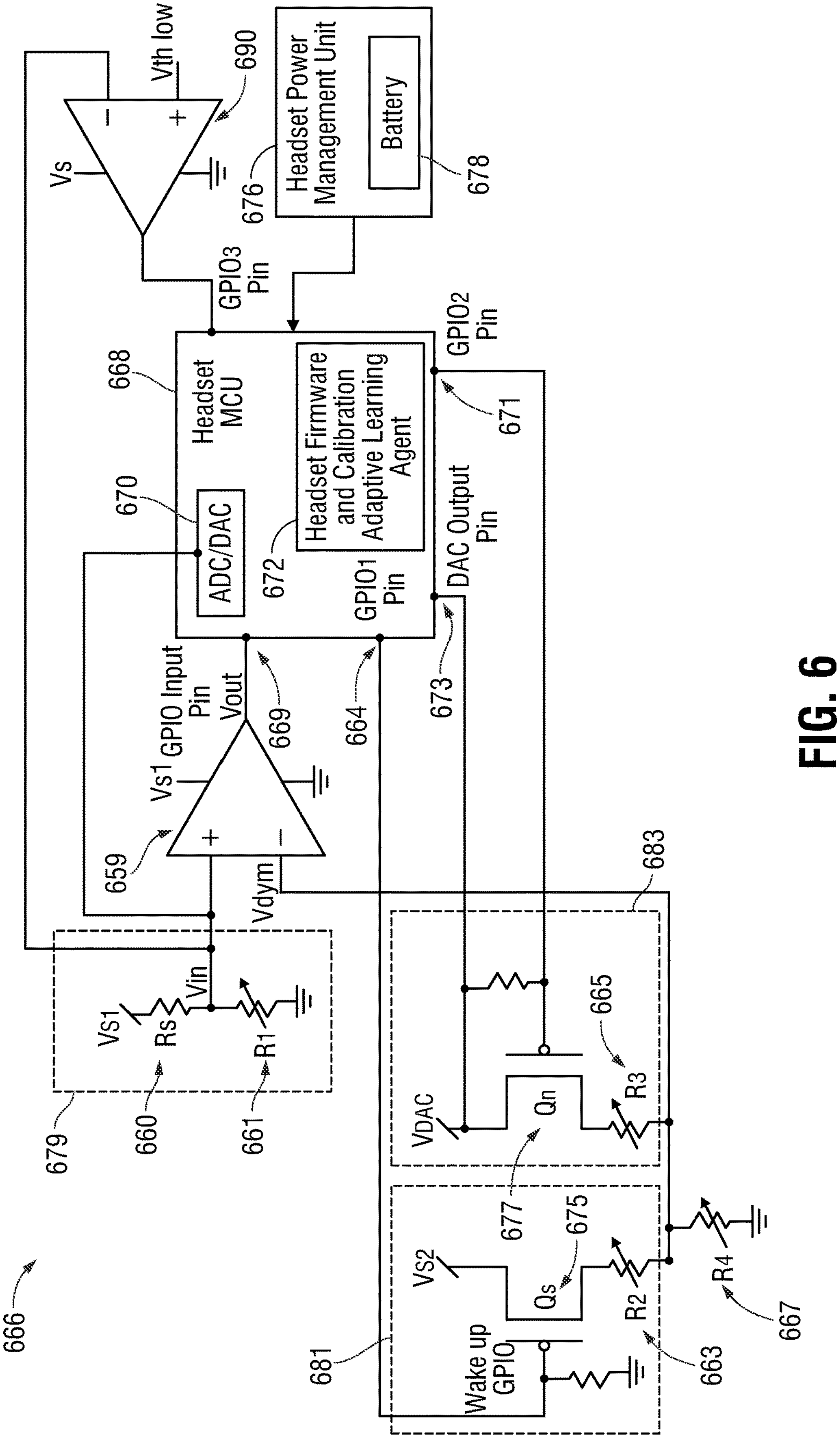
Figure 7A:
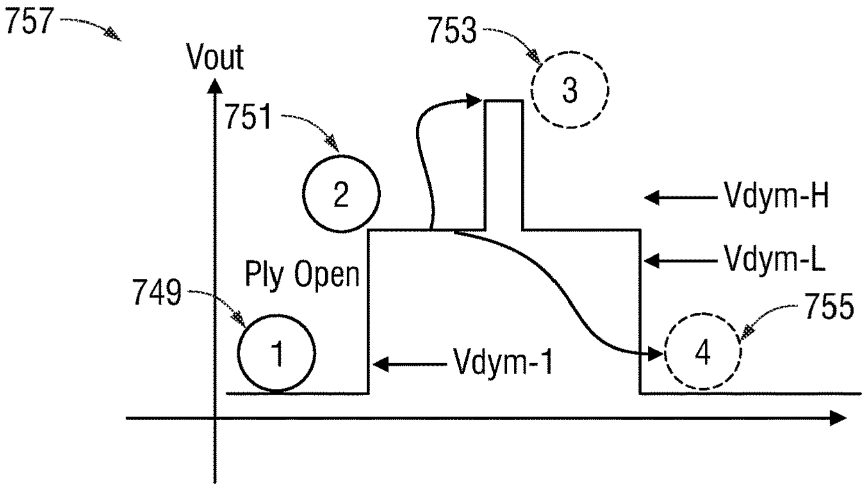
Figure 7B:
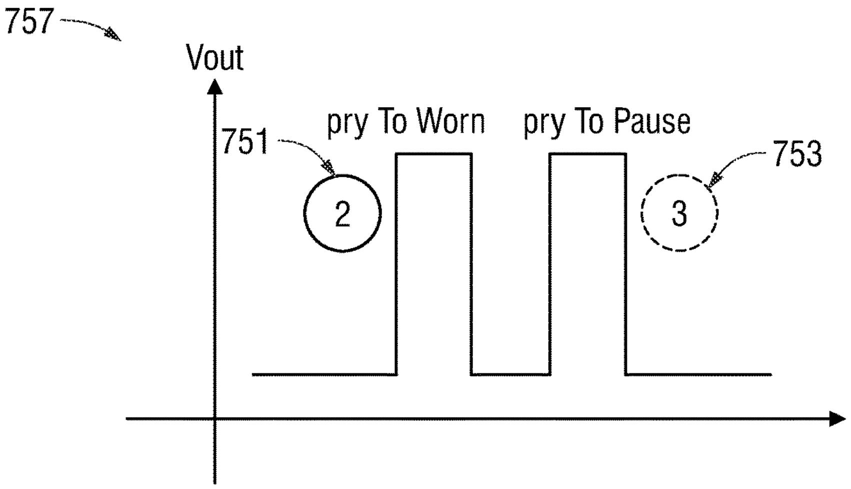
Figure 7C:
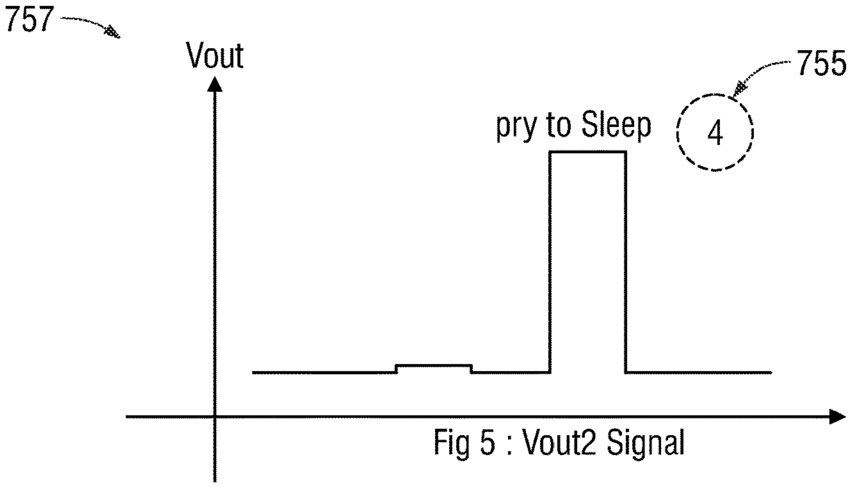
Figure 8:
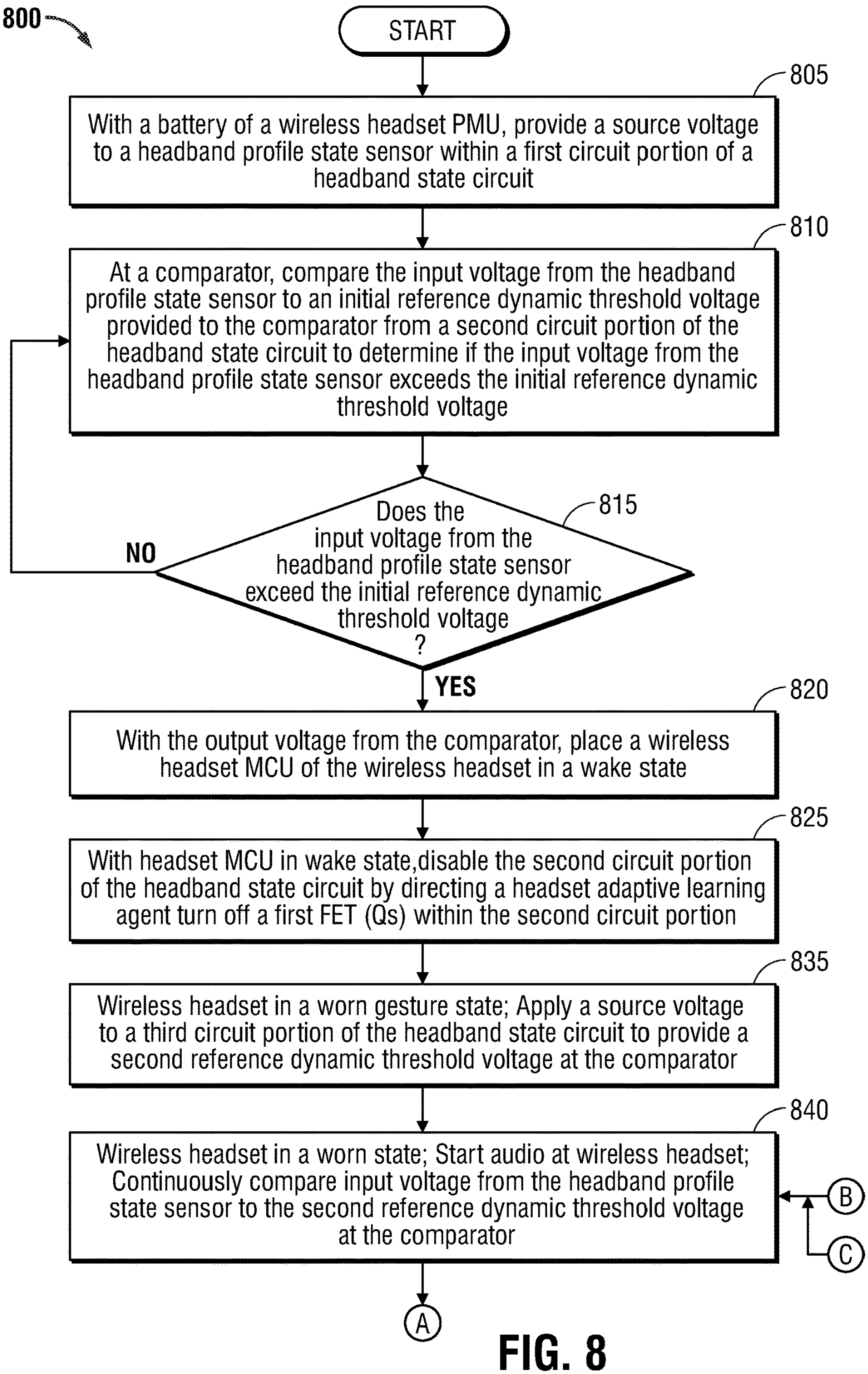
Figure 8:
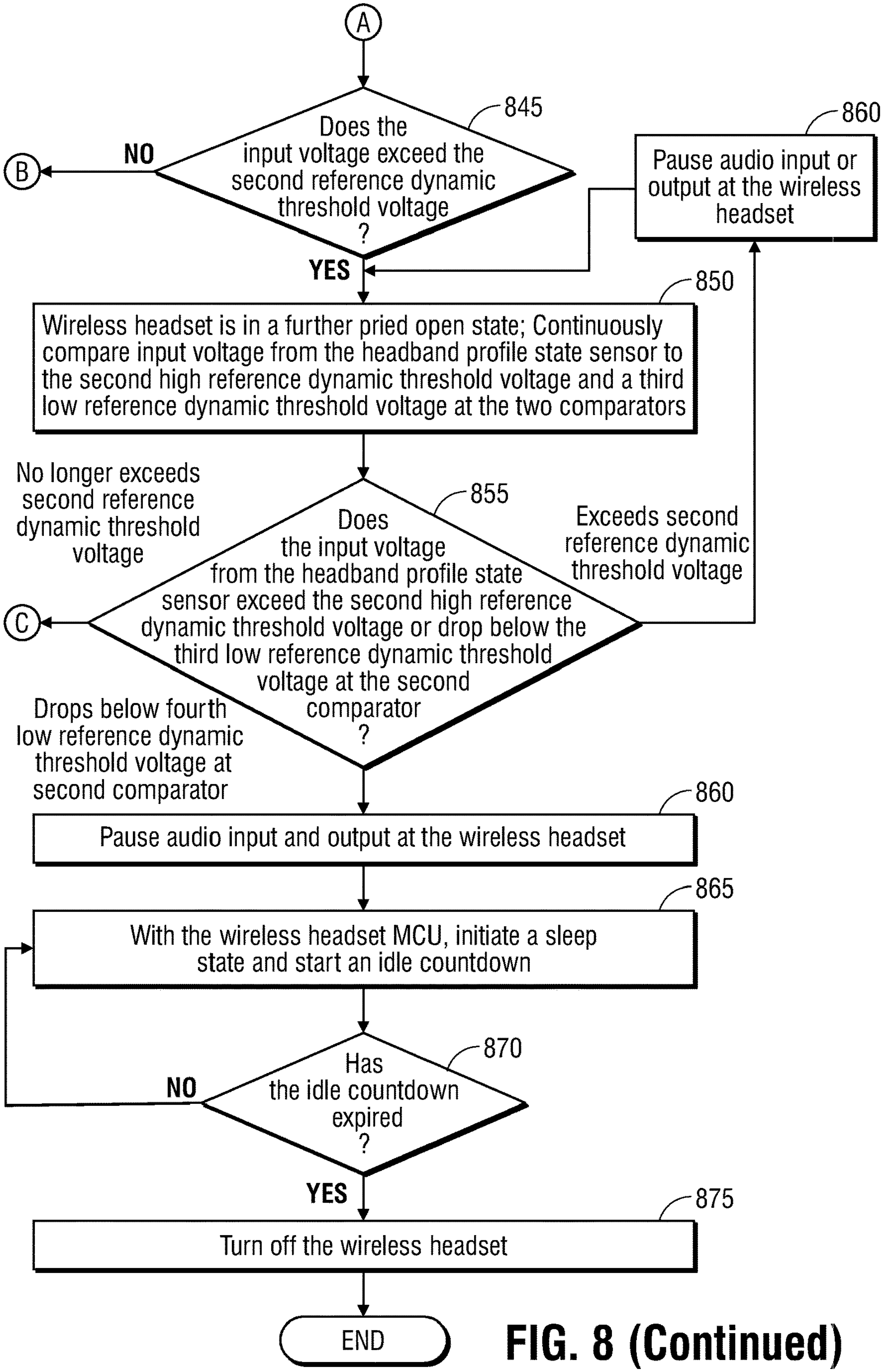

FIG. 6 is a circuit diagram of a headband state circuit within a wireless headset according to an embodiment of the present disclosure;

FIG. 7A is a voltage headband gesture state change diagram of a headband profile state sensor output/time graph indicating changes to state sensor output voltage over time as a headband gesture state of a wireless headset changes according to an embodiment of the present disclosure;

FIG. 7B is a voltage headband gesture state change diagram of a comparator output/time graph indicating changes to headband profile state sensor output voltage over time indicating a headband gesture state of a wireless headset according to another embodiment of the present disclosure;

FIG. 7C is a voltage headband gesture state change diagram of a comparator output/time graph indicating changes to headband profile state sensor output voltage over time indicating a headband gesture state of a wireless headset according to yet another embodiment of the present disclosure; and FIG. 8 is a block flow diagram of a method of detecting transitions among headband gesture states of a wireless headset according to an embodiment of the present disclosure.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Wireless headsets are used as an input/output device with an information handling system. In some examples, these wireless headsets may include a microphone in order to provide input to the information handling system in the form of audio input. The wireless headset also includes one or more earpieces used to receive audio output from the information handling system. These earpieces may be held together using a headband. The headband may be adjustable to fit a user's head when worn.

Due to the wireless operation of the wireless headset, however, an outside source of power is not available and, instead, a battery is used as the power source. It is a goal to reduce the amount of power consumption of this battery in order to extend the time that a user may operate the wireless headset between recharging or replacement of the battery. In order to accomplish this, it may be beneficial to detect when the wireless headset is not being used and, accordingly, turn the wireless headset off or transition the wireless headset to a low power or sleep mode. Current wireless headsets cannot detect headband gesture states when the wireless headset is or is not being used or is further pried open.

The present specification describes a wireless headset that can detect when the user is not using the wireless headset and when the user is using the wireless headset based on a detected headband gesture state of the wireless headset. These headband gesture states include a worn gesture state and an un-worn gesture state, a further pried apart gesture state in some embodiments. A headset microcontroller unit (MCU) may detect when the wireless headset is pried open via a headset profile state sensor, such as a pressure sensor or strain gauge in a headband such that a first earpiece is separated from a second earpiece in order to place the wireless headset on the user's head or remove the wireless headset from the user's head in example headband gesture states detected in some embodiments. In order to detect these prying actions as well as the headband gesture state of the wireless headset (worn or unworn), a headband of the wireless headset includes the headband profile state sensor according to embodiments herein.

In an embodiment, the headband profile state sensor detects when the headset moved to a headset un-worn gesture state or a headset worn gesture state by detecting a change in resistance value when a distance between the first earpiece and second earpiece is increased and decreased thereby flexing the headband as detected by the force sensor. Similarly, a further pried apart gesture state or other gesture states may be detected in other embodiments. In an embodiment, the headband profile state sensor is a flex force sensor that generates a resistive value for force that is detectable at a comparator formed within a headband state circuit. A comparator may compare a voltage that has generated from the headband profile state sensor to one of an initial reference dynamic threshold voltage or a reference dynamic threshold voltage set by the headset MCU during operation. The initial reference dynamic threshold voltage may be set by the MCU based on prior use characteristics of the wireless headset such as a voltage threshold detected when a change in the resistance at the headband profile state sensor has been detected and the wireless headset has been turned on from a sleep state. A change in the resistance at the headband profile state sensor may be detected whereby the resulting input voltage to a second comparator drops below another low threshold voltage to determine a transition in the headband gesture state from a worn gesture state to an unworn gesture state in an example embodiment when the headband profile state sensor has a decrease in resistance. These reference dynamic threshold voltages may also be adjusted at the comparators to compensate for any electrical drift of the headband profile state sensor that may be detected by the headset MCU using the headband state circuit. Thus, not only may the headband state circuit and comparators be adjusted and used with varying sizes of the user's head allowing for the proper detection of worn and unworn gesture states of the wireless headset for various users, but the headband state circuit further provides for any potential drifting in detected resistance of the headband profile state sensor during the lifetime of the wireless headset and over time.

Figure 1:
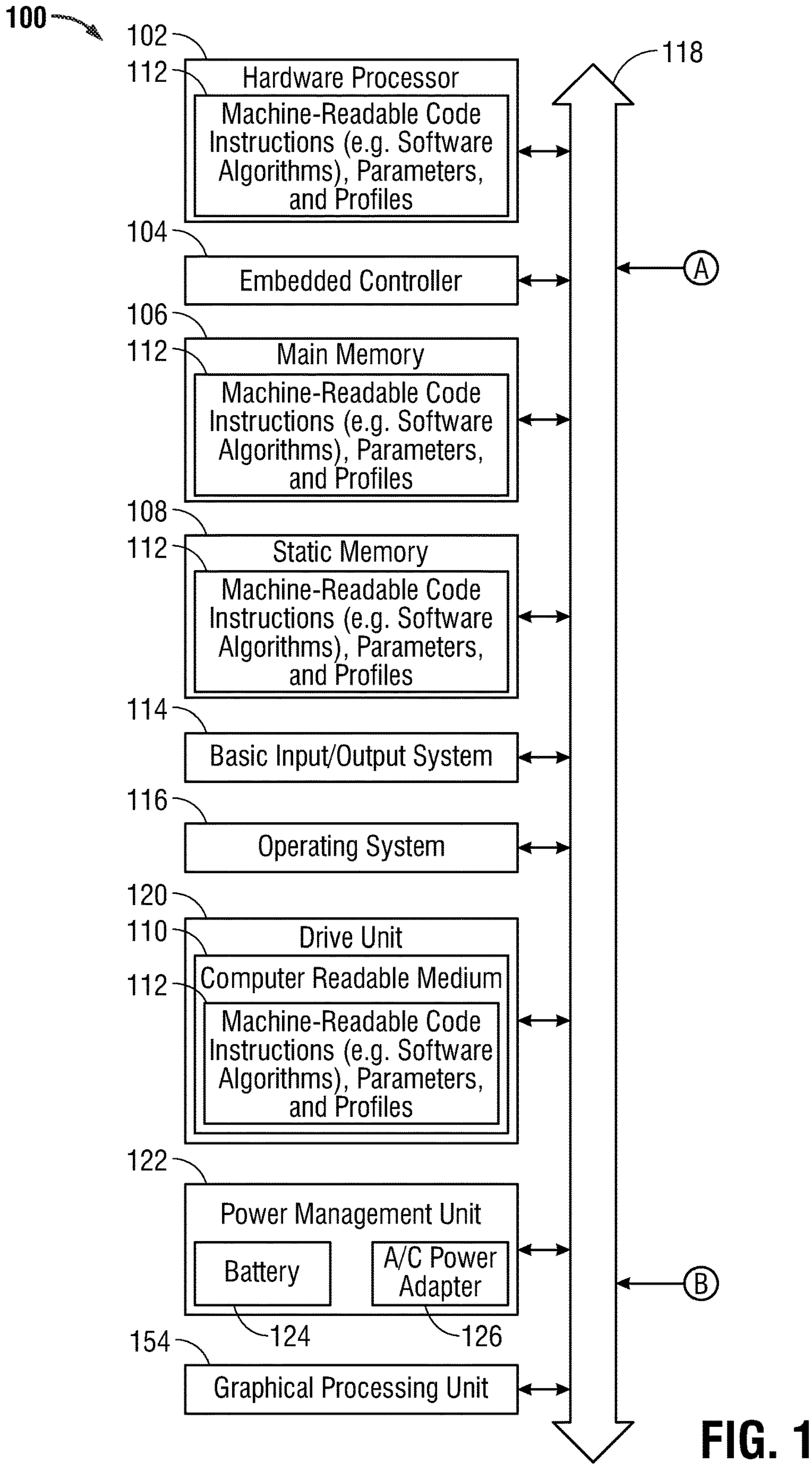
FIG. 1 is a block diagram of an information handling system including a wirelessly connected wireless headset according to an embodiment of the present disclosure.
Figure 1:
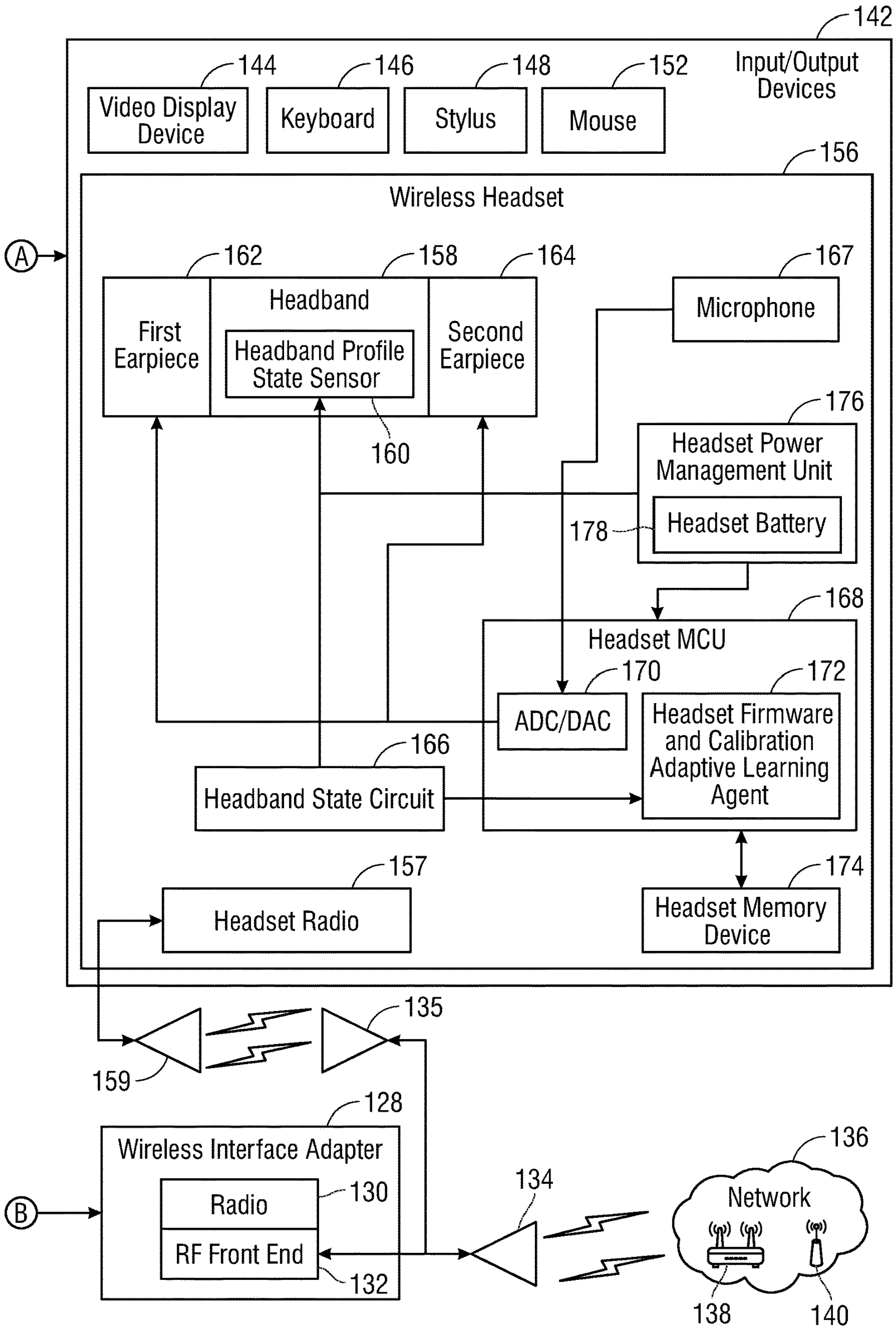

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device. Further, while a single information handling system 100 is illustrated, the term "system" shall also be taken to include any collection of systems or sub-systems that individually or jointly execute a set, or multiple sets, of instructions to perform one or more computer functions via one or more hardware processing resources.

The information handling system 100 may include memory (volatile (e.g., random-access memory, etc.), nonvolatile (read-only memory, flash memory etc.) or any combination thereof), one or more hardware processing resources, such as a central processing unit (CPU), an accelerated processing unit (APU), a neural processing unit (NPU), a vision processing unit (VPU), a digital signal processor (DSP), a graphics processing unit (GPU) 154, an embedded controller (EC) 104, a hardware processor 102, hardware controllers, or any combination thereof. In an embodiment, the hardware processor 102 may include a central processing unit (CPU) that participates in a booting process to invoke and execute pre-boot and boot firmware and execute the basic input/output system (BIOS) 114 and an operating system (OS) 116. Any of the hardware processing resources may operate to execute code that is either firmware or software code. Moreover, the information handling system 100 can include memory devices such as main memory 106, static memory 108, computer readable medium 110 storing machine-readable code instructions 112 (e.g., embodied as firmware in some embodiments) of, in an example embodiment, wireless peripheral device (PD) drivers, or other computer executable program code and firmware, and drive unit 120 (volatile (e.g., random-access memory, etc.), nonvolatile (read-only memory 176, flash memory etc.) or any combination thereof). These memory devices may be accessed by any of the hardware processors (e.g., the CPU) to access computer-readable program code of wireless I/O device drivers or other software and firmware to facilitate the wireless communication between a wireless interface adapter 128 or a wireless dongle radio, for example, with a wireless I/O device such as a wireless headset 156 as described herein. In the present specification and in the appended claims, the term "module" is meant to include that firmware, software, and/or a combination of firmware and software described herein. In an embodiment, the modules may be stored on a read-only memory device. It is appreciated, as well, that any of the modules described herein may be stored on a single or multiple memory devices and may be addressable by the CPU (e.g., hardware processor 102).

Additional components of the information handling system 100 can include one or more storage devices, one or more communications ports for communicating with external devices, as well as various wireless input and output (I/O) devices 142, such as a keyboard 146, a mouse 152, a video display device 144, a stylus 148, a trackpad 150, and the wireless headset 156 described herein or any combination thereof. In an embodiment, any of these I/O devices may be wired I/O devices such as a video display device 144 for example while others may be a wireless I/O device such as the wireless headset 156 described herein. The information handling system 100 can also include one or more buses 118 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above and operates to perform one or more of the methods described herein. The information handling system 100 may execute machine-readable code instructions 112 via the described hardware processing resources that may operate on servers or systems, remote data centers, or on-box in individual client information handling systems according to various embodiments herein. In some embodiments, it is understood any or all portions of machine-readable code instructions 112 may operate on a plurality of information handling systems 100.

As shown, the information handling system 100 may further include a video display device 144 used to provide visual output to a user. The video display device 144, in an embodiment, may function as a liquid crystal display (LCD), an organic light emitting diode (OLED), a flat panel display, or a solid-state display. Although FIG. 1 shows a single video display device 144, the present specification contemplates that multiple video display devices 144, any of which may be wired or wireless, may be used with the information handling system to facilitate an extended desktop scenario, for example. Additionally, the information handling system 100 may include one or more wired or wireless input/output devices 142 including an alpha numeric input device such as a keyboard 146 and/or a cursor control device, such as a wireless mouse 152, touchpad/trackpad 150, a stylus 148, or a gesture or touch screen input device associated with the video display device 144 that allow a user to interact with the images, windows, and applications presented to the user.

A network interface device of the information handling system 100 shown as wireless interface adapter 128 can provide radio connectivity among devices such as with Bluetooth® (BT) or Bluetooth® Low Energy (BLE), to a wireless I/O device such as the wireless headset 156 and/or network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 138 or base station 140 used to operatively couple the information handling system 100 to a network 136. Wireless interface adapter 128 may include one or more radio frequency (RF) subsystems (e.g., radio 130) with transmitter/receiver circuitry, modem circuitry, one or more radio frequency (RF) front end 132 circuits, one or more wireless controller circuits, amplifiers, antennas 134 or 135 and other circuitry of the radio 130 such as one or more antenna ports used for wireless communications via multiple radio access technologies (RATs). In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, or similar wireless standards may be used for radio layer connectivity. It is appreciated that the wireless interface adapter 128 may also be used to communicate with a wireless I/O device such as the wireless headset 156 described herein using BLE or other BT protocol at, for example, the 2.4 GHz or 6 GHz band via radio 130 and RF front end circuitry 132 in embodiments herein.

In an embodiment, the information handling system 100 can include one or more sets of machine-readable code instructions, parameters, and profiles 112 that can be executed to cause the computer system to perform any one or more of the methods or computer-based functions disclosed herein. For example, machine-readable code instructions, parameters, and profiles 112 may execute, via hardware processing resources, various software applications, software agents, the BIOS 114 firmware and/or software, or other aspects or components. Machine-readable code instructions, parameters, and profiles 112 may execute, via the information handling system 100, wireless device drivers such as a wireless device driver for the wireless headset 156 according to the embodiments described herein. Again, the machine-readable code instructions, parameters, and profiles 112 described herein may be stored on a non-volatile memory device and made accessible to the EC 104, the hardware processor 102, a microcontroller unit (MCU), or other hardware processing resource for execution. Various software modules comprising application instructions of machine-readable code instructions, parameters, and profiles 112 may be coordinated by an operating system (OS) 116, and/or via an application programming interface (API). An example OS 116 may include Windows®, Android®, and other OS types known in the art. Example APIs may include Win 32, Core Java API, or Android APIs.

In an embodiment, the disk drive unit 120 and may include machine-readable code instructions, parameters, and profiles 112 in which one or more sets of machine-readable code instructions, parameters, and profiles 112 such as software can be embedded to be executed by the processor 102 or other hardware processing devices such as a GPU 154 to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the drive unit 120 during execution by the hardware processor 102, EC 104, or GPU 154 of information handling system 100. The main memory 106, GPU 154, EC 104, and the hardware processor 102 also may include computer-readable media.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like. The information handling system 100 may also have read-only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102, and other hardware components described herein. The PMU 122 may control power to one or more components including a wireless dongle operatively coupled to a universal serial bus (USB) port used to communicate with the wireless headset 156, the wireless interface adapter 128, the one or more drive units 120, the hardware processor 102 (e.g., CPU), the EC 104, the GPU 154, a video/graphic display device 144, or other wired input/output devices 142 such as the stylus 148, a mouse 152, a keyboard 146, and a trackpad 150 and other components that may require power when a power button has been actuated by a user. In an embodiment, the PMU 122 may monitor power levels and be electrically coupled, either wired or wirelessly, to the information handling system 100 to provide this power and coupled to bus 118 to provide or receive data or machine-readable code instructions. The PMU 122 may regulate power from a power source such as a battery 124 or AC power adapter 126. In an embodiment, the battery 124 may be charged via the AC power adapter 126 and provide power to the components of the information handling system 100, via wired connections as applicable, or when AC power from the AC power adapter 126 is removed. PMU 122 may include a hardware controller to operate with the EC 104 separately or together to execute machine-readable code instructions, parameters, and profiles 112 described herein at the information handling system 100.

In a particular non-limiting, exemplary embodiment, the computer-readable medium described herein can include a solid-state memory such as a memory card or other package that houses one or more non-volatile read-only memories or volatile type memory. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, ARM® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

As described herein, the information handling system 100 may be operatively coupled to a wireless I/O device or other I/O device. The wireless coupling of the information handling system 100 to the wireless I/O device may be accomplished, in one embodiment, via operation of the wireless interface adapter 128, radio 130, and RF front end 132 to communicate with any wireless I/O device 142 including the wireless headset 156 described herein via BT or BLE 2.4 GHz band, 6 GHz band, or other appropriate band. In another embodiment, the wireless coupling of the information handling system 100 to the wireless I/O device may be accomplished, in one embodiment, via operation of a wireless dongle radio (not shown) that includes and wireless dongle antenna to communicate with any wireless I/O device 142 including the wireless headset 156 via a BT or BLE 2.4 GHz band, 6 GHz band, or other appropriate band. Therefore, the wireless communication may be conducted using an internal wireless communication system within the information handling system 100 or via a wireless dongle operatively coupled to the information handling system 100 via a USB port or other wired connection.

As described herein, the information handling system 100 in an embodiment is operably coupled to a wireless I/O device such as the wireless headset 156. The wireless headset 156 may be used by a user to receive output from the information handling system 100 in the form of audio. The wireless headset 156 includes a headset radio 157 and antenna 159 to wirelessly couple to the wireless interface adapter 128 of the information handling system. The wireless headset 156, therefore, includes a first earpiece 162 and a second earpiece 164 that, when worn, are placed over the user's ears to provide audio output via one or more speakers located in the first earpiece 162 and second earpiece 164. In an embodiment, the wireless headset 156 may also allow the user to provide input to the information handling system 100 via, for example, a microphone 167. In an embodiment, the audio provided via the microphone may be interpreted by the information handling system 100 as specific commands or, in the context of a gaming scenario, allow the user to communicate with other users executing online gaming software on their respective information handling systems.

The wireless headset 156 further includes a headband 158 operatively coupled to the first earpiece 162 and the second earpiece 164. The headband 158 may separate the first earpiece 162 and second earpiece 164 thereby orientating the first earpiece 162 and second earpiece 164 away from each other. This allows a user to grasp the first earpiece 162 and second earpiece 164 in each hand and cause the headband 158 to flex such that the first earpiece 162 can be separated away from the second earpiece 164 by a distance. This flexing of the headband 158 allows the user to put the wireless headset 156 on with the first earpiece 162 being placed over a first ear of the user and the second earpiece 164 being placed over a second ear of the user. Once worn, the headband 158 may rest on the top of the user's head thereby securing the wireless headset 156 to the user's head during use.

The wireless headset 156 described herein further allows for the detection of different headband gesture states of the wireless headset 156. These headband gesture states include a worn gesture state, an un-worn gesture state, and a further pried apart gesture state in some example embodiments. In the embodiments herein, a headset MCU 168 may receive data from a headband profile state sensor 160 formed within the headband 158 indicative of when the wireless headset 156 is not being worn (e.g., unworn gesture state) by detecting an absence of a flex in the headband 158. In this embodiment, because the headband 158 was not flexed and the first earpiece 162 and second earpiece 164 are close together, the headband profile state sensor 160 does not provide input to the headset MCU 168 indicative of a detection in the flex of the headband 158 and therefor determines that the wireless headset 156 is in an un-worn gesture state. Conversely, when the headband profile state sensor 160 formed in the headband 158 detects the flex of the headband 158, this data is sent to the headset MCU 168 and the headset MCU 168 determines that the headband 158 has been flexed to a degree indicative of a worn gesture state or a further pried apart gesture state.

In an embodiment, the headband profile state sensor 160 may be any type of sensor that can detect a flex change in the headband 158. For example, the headband profile state sensor 160 includes a short flex sensor or bend sensor (e.g., a flex sensor of substantially 2 inches (+/−0.4 inches), a long flex sensor or bend sensor (e.g., a flex sensor of approximately 5 inches+/−1 inch), a force resistive sensor, a piezoresistive force sensor (e.g., FlexiForce™ A101 or FlexiForce™ VS Shunt Mode Sensor by Tekscan Inc.®), a capacitive or magnetic flex sensor, and the like. The flex sensors described in an embodiment herein as an example of the headband profile state sensor 160 may measure an amount of deflection or bending such that a resistance of the resistive sensor elements in the flex sensors is varied depending on the bending of the surface, in this case, the headband 158 of the wireless headset 156. The force resistive sensor described herein as an example embodiment of the headband profile state sensor 160 generates a change in electrical resistance when an external force is applied to it. As such, both the force resistive sensor or other flex sensors described herein as example embodiments of a headband profile state sensor 160 may serve as a variable resistor element formed as part of a headband state circuit 166. Other types of flex sensors may form part of a headband state circuit 166 in other embodiments based on capacitive or magnetic variations with flex. The headband profile state sensor 160 is used to detect the deflection of the headband 158 and, therefore, detect an un-worn gesture state, worn gesture state, a further pried apart gesture state or other change in distance between the first earpiece 162 and second earpiece 164 (for example, a potential intermediate gesture state between the worn gesture state and worn gesture state) or other headband gesture states of the wireless headset 156.

The wireless headset 156, as described herein, also includes a headband state circuit 166 operatively coupled to a headset MCU 168. Again, the headband profile state sensor 160 serves as a variable resistive element within the headband state circuit 166 in an embodiment that detects when the headband gesture state of the wireless headset 156 has changed. In an embodiment, the headband state circuit 166 includes a comparator to compare a voltage provided by the headband profile state sensor 160 to, at least, an initial reference dynamic threshold voltage. In an embodiment, the headband state circuit 166 includes another comparator to compare a voltage provided by the headband profile state sensor 160 to a different, low reference dynamic threshold voltage for a return to another headband gesture state. These initial and second reference dynamic threshold voltages or others may be set based on the type of headband profile state sensor 160 used, the materials used in construction of the wireless headset 156 and, specifically, the headband 158, as well as the resistive properties of the headband profile state sensor 160, the size of a user's head, among other factors. During use when the voltage provided the headband profile state sensor 160 exceeds this initial reference dynamic threshold voltage or falls below a second, return low reference dynamic voltage, one or more comparators may provide an output voltage to a general-purpose input/output (GPIO) pin at the headset MCU 168. The headset MCU 168 also includes an integrated analog-to-digital converter (ADC)/digital-to-analog converter (DAC) 170 that receives the analog signal from the comparator and transfers that signal into a digital signal used to determine the current gesture state of the wireless headset 156. DAC 170 output may be used to trigger headset MCU 168 to adjust a reference voltage circuit in a passive circuit to provide a dynamic threshold reference voltage monitor for changes in the headband profile state sensor 160 as well as to save battery power.

It is appreciated, however, that during use the electrical properties (e.g., resistive properties) of the headband profile state sensor 160 may drift or change. This may be especially true as the user consistently bends the headband 158 in order to put the wireless headset 156 on the user's head or remove it therefrom. This action may degrade the headband profile state sensor 160 over time resulting in this sensor output drift at the headband profile state sensor 160. The headset MCU 168, therefore, is operatively coupled to a headset firmware and adaptive learning agent 172. The headset firmware and adaptive learning agent 172, when executed by the headset MCU 168, compensates for this drift by actively adjusting the bias gain in the passive circuit used to provide a reference dynamic threshold voltage at the comparator in a sleep state or an active state so that the headband state circuit 166 is able to, for example, detect headband state gestures accurately to determine when the wireless headset 156 is to wake the MCU from a sleep state or when the other headband gesture states are changed (e.g., worn, pry open, un-worn) to trigger a sleep state or control audio input or output data.

The wireless headset 156 further includes a headset memory device 174 used to store data such as voltage reference points and reference dynamic threshold voltages for various headband gesture state thresholds as determined for use with one or more comparators in the headband state circuit 166. Such reference dynamic threshold voltages are determined to operate as the comparing voltage at the one or more comparators within the headband state circuit 166 for various headband gesture states and adjusted for drift, head size, or other variables. The headset memory device 174 may be a flash memory device, a RAM device, or other types of memory devices that operate with the headset MCU 168 to store the computer-readable code used to execute the methods described herein.

The wireless headset 156 further includes a headset PMU 176. The headset PMU 176 may include a hardware controller and executable machine-readable code instructions to manage the power provided to the components of the wireless headset 156 such as the headset MCU 168, and other hardware components that include audio drivers and the headband state circuit 166 described herein. The headset PMU 176 may control power to one or more components that may require power when a power button on the wireless headset 156 has been actuated by a user. In an embodiment, the headset PMU 176 may monitor power levels and be electrically coupled to the headset MCU 168 to provide this power. The headset PMU 176 may regulate power from a power source such as the headset battery 178 and control headset sleep states. In an embodiment, the battery 178 may be recharged via an AC power adapter. The headset PMU 176 may include a hardware controller to operate with the headset MCU 168 separately or together to execute machine-readable code instructions described herein.

Figure 2:
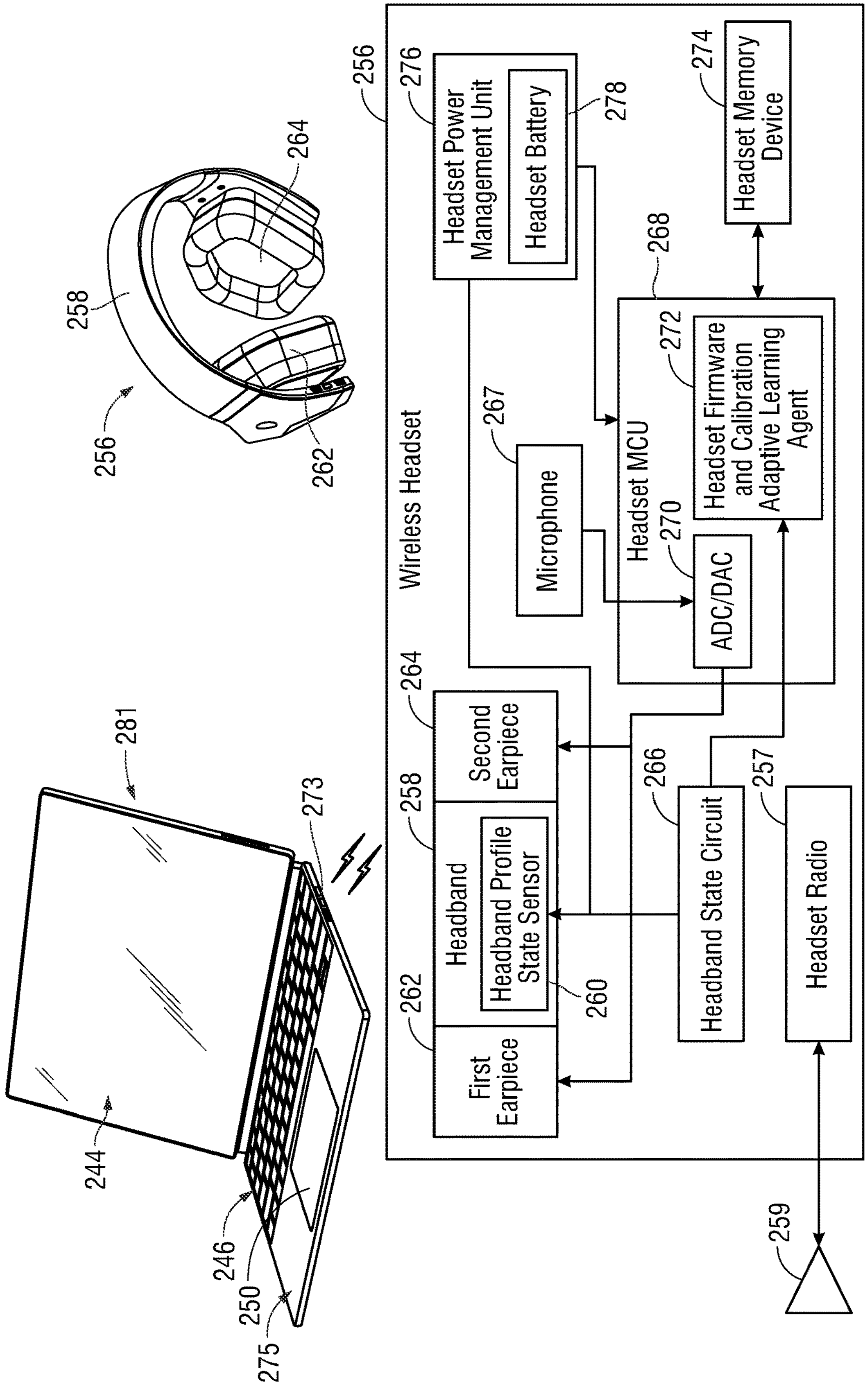
FIG. 2 is a graphic diagram of an information handling system including a wirelessly connected wireless headset according to an embodiment of the present disclosure.

FIG. 2 is a graphic diagram of an information handling system 200 including a wirelessly connected wireless headset 256 according to an embodiment of the present disclosure. The information handling system 200 shown in FIG. 2 is a laptop-type information handling system 200. However, as described herein, the information handling system 200 may include other types of information handling system 200 such as a desktop, mobile smartphone, tablet, or other type of information handling system as described in connection with FIG. 1. The laptop-type information handling system 200 in the shown embodiment may include a base chassis 275 operatively coupled to a display chassis 281 via, for example, a hinge that allows the display chassis 281 to be closed onto the base chassis 275 and opened away from that base chassis 275. The display chassis 281 may include a bezel or a video display device 244 that is operatively coupled to the back display chassis to form the display chassis 281. The base chassis 275 may include a bottom chassis that is operatively coupled to a keyboard chassis to form the base chassis 275. In an embodiment, the base chassis 275 may include a built-in keyboard 246 and trackpad 250 formed into the keyboard chassis for the user to provide input to the information handling system 200. As shown, the housing of the information handling system 200 may include one or more ports that allow one or more USB devices such as the USB device 286 and wireless dongle 273 to be inserted into these ports and be operatively coupled to a bus (not shown) and a hardware processor 202 formed within the housing of the information handling system 200.

As described herein, the information handling system 200 in an embodiment is operably coupled to the wireless headset 256. In the embodiment shown in FIG. 2, the wireless headset 256 is wirelessly coupled to the information handling system 200 via a headset radio 257 and a wireless interface adapter (e.g., FIG. 1, 128) at the information handling system 200. In another embodiment, the information handling system 200 may include a wireless dongle at port 273 that establishes the wireless connection between the information handling system 200 and the wireless headset 256 and a headset radio 257. The wireless dongle may be operatively coupled to the information handling system 200 at a USB port 273 formed in the chassis of the information handling system 200.

The wireless headset 256 further includes a headband 258 operatively coupled to the first earpiece 262 and the second earpiece 264. The headband 258 may separate the first earpiece 262 and second earpiece 264 thereby orientating the first earpiece 262 and second earpiece 264 away from each other. This allows a user to grasp the first earpiece 262 and second earpiece 264 in each hand and cause the headband 258 to flex such that the first earpiece 262 can be separated away from the second earpiece 264 by a distance. This flexing of the headband 258 allows the user to put the wireless headset 256 on with the first earpiece 262 being placed over a first ear of the user and the second earpiece 264 being placed over a second ear of the user. Once worn, the headband 258 may rest on the top of the user's head thereby securing the wireless headset 256 to the user's head during use.

As described herein, the wireless headset 256 described herein further allows for the detection of different headband gesture states of the wireless headset 256. In an embodiment, the detection of these headband gesture states determines whether the wireless headset 256 is placed in an unworn gesture state to trigger a sleep state or mode (e.g., deep sleep state), whether the wireless headset 256 outputs audio by pausing the audio input or playback in a further pried apart gesture state, whether the wireless headset 256 is turned off, or whether the headset is in a worn gesture state on a user's head after being in a sleep state to turn on audio input or output. These headband gesture states include a worn gesture state and an un-worn gesture state and a further pried apart gesture state of the first earpiece 262 or second earpiece 264 such as to listen to someone in the room. The various headband gesture states may be detected by the headband profile state sensor 260 to determine a transition between these headband gesture states due to a user adjusting the earpieces 262 or 264 and thus the headband 258.

In the embodiments herein, a headset MCU 268 may receive data from the headband profile state sensor 260 formed within the headband 258 indicative of when the wireless headset 256 is not being worn (e.g., unworn gesture state) by detecting an absence of a flex in the headband 258 or the sensor voltage at a comparator, for example a second comparator, falling below a reference threshold level indicating that flex has been removed from the headband 258. In this embodiment, because the headband 258 was not flexed or is no longer flexed and the first earpiece 262 and second earpiece 264 are close together, the headband profile state sensor 260 does not provide input to the headset MCU 268 indicative of a detection in the flex of the headband 258 and therefor determines that the wireless headset 256 is in an un-worn gesture state. In an embodiment, the headband profile state sensor 260 is operatively coupled to a voltage source with the headband profile state sensor 260 acting as a variable resistive element in the headband state circuit 266. As a current at a specific voltage is passed through the headband profile state sensor 260, any flex in the headband 258 creates lower resistance through the headband profile state sensor 260 thereby increasing the sensor voltage signal sent to either of the comparators (voltage increase across the headband profile state sensor 260 is realized). However, where the headband 258 is not flexed, a base resistance through the headband profile state sensor 260 is realized and a base sensor voltage that is lower is received at one or both of the comparators to be compared to another voltage (initial or second reference dynamic threshold voltage or return lower reference dynamic threshold voltage) received from within the headband state circuit 266. The comparator compares these voltages and provides an output voltage signal to the ADC/DAC 270 or via one or more general-purpose input/output (GPIO) pins of the headset MCU 268 when the initial threshold voltage is exceeded indicating was earpieces were pried apart entering an active worn gesture state or the earpieces were allowed to come together indicating an unworn gesture state. The sensor voltage exceeding an initial reference dynamic threshold voltage allows the headset MCU 268 to be woken up for example. In an embodiment, upon entering a wake state, the ADC/DAC 270 may convert the analogue signal from the comparator into a digital signal with an ADC/DAC 270 using a voltage signal to a p-channel metal-oxide-semiconductor field-effect transistor (pMOSFET) to establish a second reference dynamic threshold voltage during the wake state of the wireless headset. Therefore, unless the increase in voltage resulting from a drop in resistance at the headband profile state sensor 260 being flexed is detectable at the comparator and the increase in voltage exceeds the initial reference threshold voltage, the firmware used to operate the wireless headset 256 is not executed at the headset MCU 268 and the passive circuit provides the initial reference threshold voltage while wireless headset 256 is not in an active wake mode. Similarly, when the voltage level at the comparator drops below a return reference dynamic threshold voltage at a second comparator after having been in a worn gesture state, this lower sensor voltage signal may initiate a sleep mode and turn off audio input and output with the headset PMU 276 to preserve battery 278 in some embodiments.

Conversely, when the headband profile state sensor 260 formed in the headband 258 detects the flex of the headband 258, this data is sent to the headset MCU 268 via the comparator detecting the increase in voltage above the initial dynamic threshold voltage and the headset MCU 268 determines that the headband 258 has been flexed to a degree indicative of a worn gesture state. In an embodiment, the drop in resistance through the headband profile state sensor 260 as detected at the comparator (e.g., increase in sensor voltage provided) causes the comparator to provide an output voltage ($V_{out}$) that signals MCU to wake and the triggering of firmware to be loaded to and executed at the headset MCU 268 thereby waking the headset MCU 268 out of a sleep state for operation. This not only allows the functions of the wireless headset 256 to be initiated (e.g., audio output at the first earpiece 262 and/or second earpiece 264 or audio input at microphone 267), but also causes the headset MCU 268 to start to determine or monitor for the current or next transition of a headband gesture state of the wireless headset 256.

In an embodiment, the headband profile state sensor 260 may be any type of sensor that can detect a flex change in the headband 258. For example, the headband profile state sensor 260 includes a short flex sensor or bend sensor (e.g., a flex sensor of substantially 2 inches (+/−0.4 inches), a long flex sensor or bend sensor (e.g., a flex sensor of approximately 5 inches+/−1 inch), a force resistive sensor, a piezoresistive force sensor (e.g., FlexiForce™ A101 or FlexiForce™ VS Shunt Mode Sensor by Tekscan Inc.®), a capacitive or magnetic sensor, or other strain gauge sensor, and the like. The flex sensors described herein as an example embodiments of the headband profile state sensor 260 may measure an amount of deflection or bending such that a resistance of the resistive sensor elements in the flex sensors is varied depending on the bending of the surface, in this case, the headband 258 of the wireless headset 256. The force resistive sensor described herein as an example of the headband profile state sensor 260 reduces an electrical resistance when an external force is applied to it. The piezoresistive force sensor described herein as an example embodiment of the headband profile state sensor 260 may detect a force applied to the piezoresistive force sensor that compresses two layers of flexible, printed, piezoresistive ink together resulting in a proportional change in electrical signal as the resistance is lower when additional force is applied to the surface of the piezoresistive force sensor. As such, the force resistive sensor, piezoresistive force sensor, and flex sensors described herein as example embodiment of a headband profile state sensor 260 may serve as a variable resistor element formed as part of a headband state circuit 266. The headband profile state sensor 260 is used to detect the deflection of the headband 258 and, therefore, be used to detect an un-worn gesture state, worn gesture state, a further pried apart gesture state detecting a change in distance between the first earpiece 262 and second earpiece 264 during a worn gesture state, or any potential intermediate gesture state between the unworn gesture state and the worn gesture state or transition to return to an unworn headband gesture state of the wireless headset 256.

The wireless headset 256 described herein also includes a headband state circuit 266 operatively coupled to a headset MCU 268. Again, the headband profile state sensor 260 serves as a variable resistive element within the headband state circuit 266 that detects when the gesture state of the wireless headset 256 has changed by distending or relaxing the headband of the wireless headset and a sensor voltage level provided to one or more comparators of the headband state circuit 266 serves to detect whether the voltage received from the headband profile state sensor 260 increases above a threshold voltage (e.g., an initial reference dynamic threshold voltage) or below another return reference dynamic threshold voltage. In an embodiment, the comparator of the headband state circuit 266 is used to compare a voltage passing through the headband profile state sensor 160 to, at least, an initial reference dynamic threshold voltage in one embodiment. This initial reference dynamic threshold voltage may be set based on the type of headband profile state sensor 260 used, the materials used in construction of the wireless headset 256 and, specifically, the headband 258, as well as the resistive properties of the headband profile state sensor 260, among other factors. During use when the sensor voltage provided from the headband profile state sensor 260 increases voltage at a first comparator above this initial reference dynamic threshold voltage, the comparator may provide a digital output voltage to a general-purpose input/output (GPIO) pin at the wireless headset MCU 268. This initial digital output voltage from the comparator may wake the wireless headset MCU 268. The MCU may use a digital signal from a comparator in the headband state circuit to determine the current headset gesture state with headset firmware of the headset firmware and calibration adaptive learning agent 272 executing on the wireless headset MCU 268 of the wireless headset 256 via the reference dynamic threshold voltage at the comparator compared to the sensor input voltage. In an embodiment, the output from the comparator ($V_{out}$) of the headband state circuit 266 is biased to a saturation/cutoff voltage level to provide a logic “1” or logic “0” at the headset MCU 268 for a pulsed logic signal to the wireless headset MCU 256. The comparator is biased to saturation or cutoff level such that a binary output of high or low is provided which in turn is a power saving mode for the comparator providing additional power savings for the system of the present embodiment. For example, where the headband profile state sensor is flexed, the sensor resistance is lower such that a high voltage is detected at the input voltage ($V_{in}$) at the comparator of the headband state circuit 266. This creates a voltage output ($V_{out}$) at the comparator that is logic high pulse or, as detected by the headset MCU, a logic “1” indicating a transition from a first headband gesture state (e.g., unworn) to a second headband gesture state (e.g., worn).

The headset MCU 268 also includes an integrated ADC/DAC 270 that receives the analog signal from the sensor to determine its level for setting the DAC output for use to set the next reference dynamic threshold voltage at the comparator. The ADC/DAC 270 may issue an DAC output signal for setting a voltage level for a pMOSFET and a GPIO signal to trigger the pMOSFET or other system in a passive circuit of the headband state circuit 266 to provide a second reference dynamic threshold voltage at the comparator in some embodiments for detecting another headband gesture state transition, such as to a further pried apart headband gesture state.

It is appreciated, however, that during use the electrical properties (e.g., resistive properties) of the headband profile state sensor 260 may drift, change, or vary depending on a user (such as user head size). This may be especially true as the user consistently bends the headband 258 in order to put the wireless headset 256 on the user’s head or remove it therefrom. This action may degrade the headband profile state sensor 260 output precision over time resulting in a sensor output drift at the headband profile state sensor 260. The headset MCU 268, therefore, is operatively coupled to a headset firmware and adaptive learning agent 272. The headset firmware and adaptive learning agent 272, when executed by the headset MCU 268, compensates for this drift by actively adjusting the bias gain within the passive circuits of headband state circuit 266 for providing one or more adjusted reference dynamic threshold voltages at one or more comparators so that the headband state circuit 266 is able to, for example, detect when the wireless headset 256 is transitioning to a worn gesture state to wake from a sleep state and when the other headband gesture states of the wireless headset 256 change to cause alterations to audio input or output or trigger a sleep state.

The wireless headset 256 further includes a headset memory device 274 used to store data such as voltage reference points and reference dynamic threshold voltages determined to operate as the comparing voltage at the comparator within the headband state circuit 266 for various transition stages of the headband gesture states in an embodiment. The headset memory device 274 may be a flash memory device, a RAM device, or other types of memory devices that operate with the headset MCU 268 to store the computer-readable code used to execute the methods described herein.

The wireless headset 256 further includes a headset PMU 276. The headset PMU 276 may include a hardware controller and executable machine-readable code instructions to manage the power provided to the components of the wireless headset 256 such as the headset MCU 268, and other hardware components that include audio drivers and the headband state circuit 266 described herein. The headset PMU 276 may control power to one or more components that may require power when a power button on the wireless headset 256 has been actuated by a user or the headset 256 has or been awakened from a sleep state. In an embodiment, the headset PMU 276 may monitor power levels and be electrically coupled to the headset MCU 268 to provide this power. The headset PMU 276 may regulate power from a power source such as the headset battery 278. In an embodiment, the battery 278 may be recharged via an AC power adapter. The headset PMU 276 may include a hardware controller to operate with the headset MCU 268 separately or together to execute machine-readable code instructions described herein.

Figure 3:
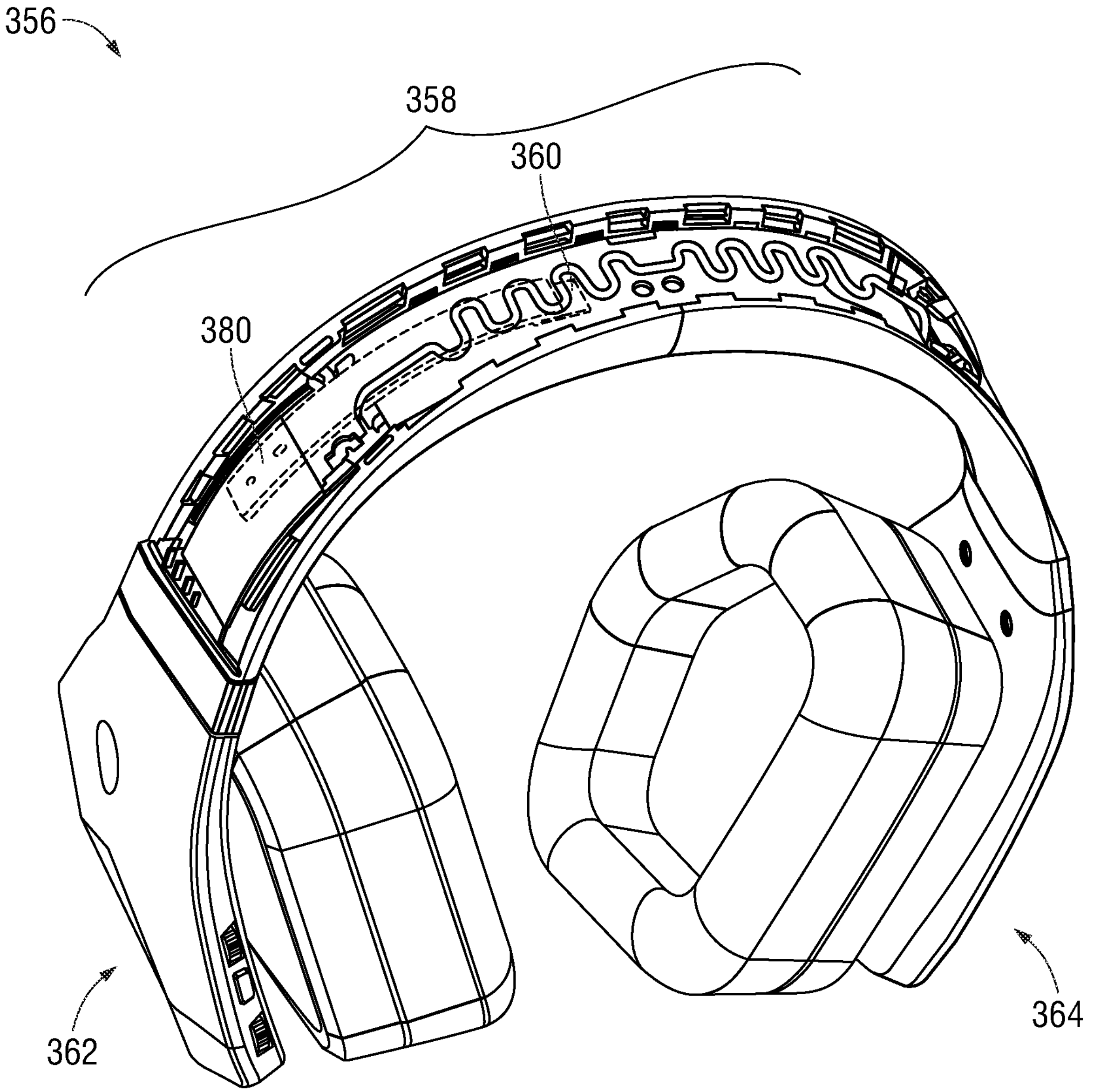
FIG. 3 is a graphic diagram of a wireless headset including a headband profile state sensor according to an embodiment of the present disclosure.

FIG. 3 is a graphic diagram of a wireless headset 356 including a headband profile state sensor 360 according to an embodiment of the present disclosure. In the embodiment shown in FIG. 3, the headband profile state sensor 360 is a force resistive sensor. As described herein, a force resistive sensor is one example embodiment of the headband profile state sensor 360 and other types of headband profile state sensors 360 are contemplated in the present specification.

In FIG. 3, the wireless headset 356 is shown with a top surface of the headband 358 being removed to show the headband profile state sensor 360 along with a deflector 380 formed along the contour of the headband 358 and abutting and operatively coupled to the headband profile state sensor 360. The contouring shape of the deflector 380 may serve multiple purposes. The first purpose may be to create additional rigidity (apart from any other structural mechanical elements in the headband 358) to the headband 358 and a mechanically resistive force that causes the first earpiece 362 and second earpiece 364 to resist being pulled apart from one another. This creates a pinching force, along with the headband shape and a headband spring in some embodiments, against the user’s head when the wireless headset 356 is being worn.

A second purpose of the deflector 380 is to apply a force against the surface of the headband profile state sensor 360 in an embodiment. During operation and when the first earpiece 362 is pried away from the second earpiece 364 to activate or flex the headband 358 by the user while attempting to put the wireless headset 356 on, a contact ridge or raised portion (e.g., 482 in FIG. 4) at a distal or upper end of the deflector 380 along headband 358 may apply an increasing amount of force against the headband profile state sensor 360 proportional to the amount of deflection of the headband 358 during flexing. Because the deflector 380 is operatively coupled to the headband 358 at a proximal or lower end opposite the distal end, force is applied by the distal end to the headband profile state sensor 360. As described herein, electrical resistance at this force resistive sensor acting as the headband profile state sensor 360 is reduced as this additional force from the deflector 380 is applied to its surface. This causes the resistance through the headband profile state sensor 360 to change thereby increasing the current passing therethrough while increasing the voltage at the terminal end of the headband profile state sensor 360 for use with a headband state circuit.

Figure 4:
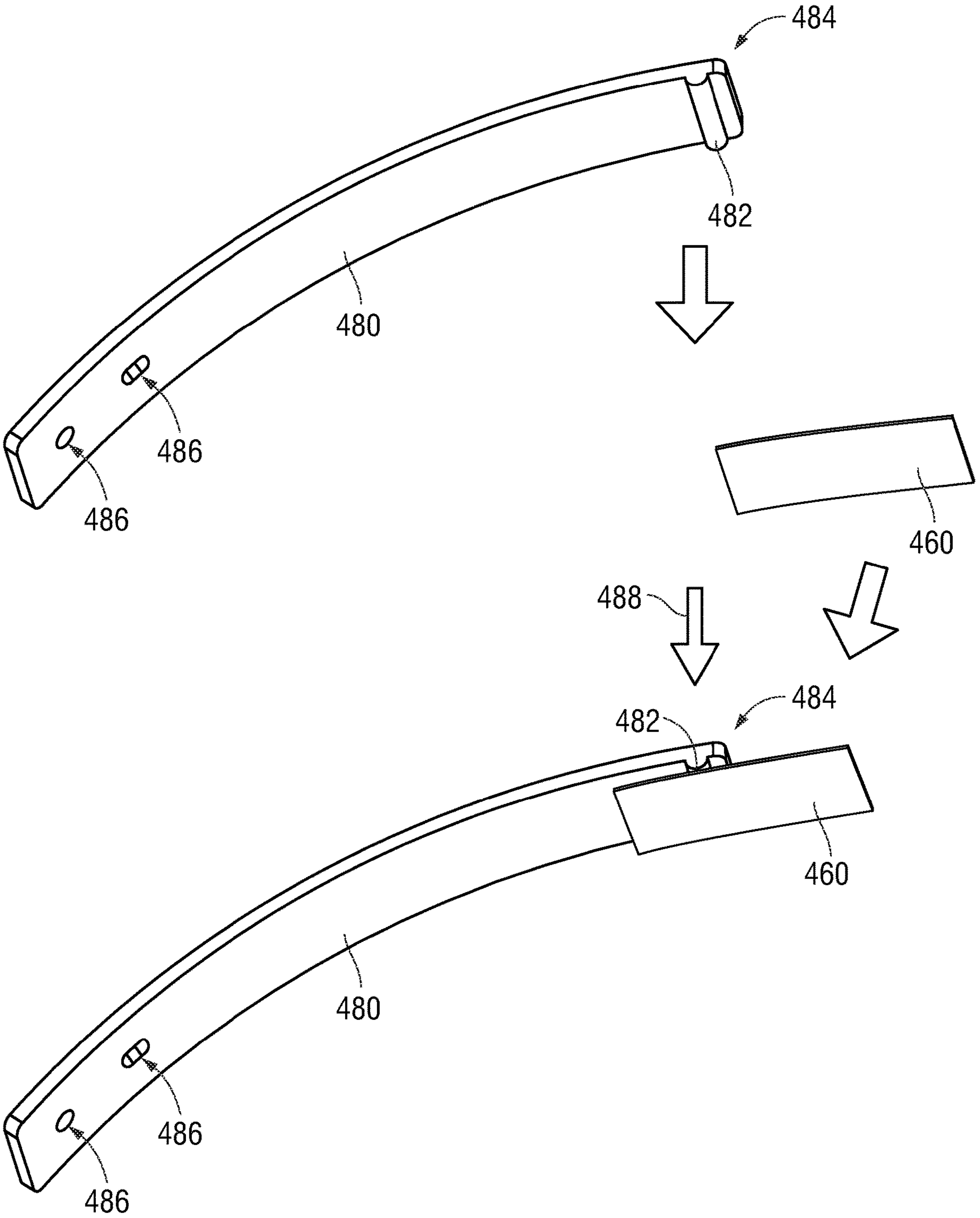
FIG. 4 is a graphic diagram of a headband profile state sensor operatively coupled to a headband deflector for a headband of a wireless headset according to an embodiment of the present disclosure.

FIG. 4 is a graphic diagram of a headband profile state sensor 460 operatively coupled to a deflector 480 for use in a headband of the wireless headset according to an embodiment of the present disclosure. The deflector 480 and headband profile state sensor 460 shown in FIG. 4 may be similar to the deflector 380 and headband profile state sensor 360 shown in FIG. 3 in an embodiment.

As shown in FIG. 4, the deflector 480 includes one or more fastener vias 486. The fastener vias 486 may be used to secure the deflector 480 to the headband of the wireless headset (e.g., FIG. 3, 356) using, for example, a screw, an interference fit, a strap, post, or other fastener. In an embodiment, the fastener vias 486 are formed at a proximal or lower end of the deflector 480 such that a distal end or moveable end 484 of the deflector 480 is allowed to move when the headband of the wireless headset is flexed. Additionally, the deflector 480 may be formed into a curve that matches the curve of the headband in an unflexed state. This allows the deflector 480 to conform to the outer surface of the headband. The deflector 480 further includes a contact ridge 482 formed on the distal end of the deflector 480. This contact ridge 482 may serve as a single touch point to hold an impart flex or force against the headband profile state sensor 460.

The headband profile state sensor 460 may be formed under the contact ridge 482 formed on the deflector 480. The headband profile state sensor 460 may be affixed to the surface of the headband using a fastener or an adhesive. The headband profile state sensor 460 may be in mechanical contact with the contact ridge 482 of the deflector 480 such that a force, as indicated by direction of force 488 arrow, is applied to flex the surface of the headband profile state sensor 460 (e.g., a force resistive sensor) when the headband of the wireless headset is flexed and rests on the surface of the headband profile state sensor 460 unflexed when the headband is not flexed. Again, as the force applied against the surface of the headband profile state sensor 460 by the contact ridge 482 increases due to the headband flexing, the resistance at the headband profile state sensor 460 is decreased resulting in a change in voltage across the headband profile state sensor 460 or a variable resistor in a headband state circuit and an increased voltage may detected at the comparator as described in embodiments herein.

It is appreciated that that the headband profile state sensor 460 may be in other forms apart from the force resistive sensor described herein. Indeed, in some embodiments herein, the headband profile state sensor 460 includes a short flex sensor or bend sensor (e.g., a flex sensor of substantially 2 inches (+/−0.4 inches) or a long flex sensor or bend sensor (e.g., a flex sensor of approximately 5 inches+/−1 inch), a force resistive sensor, a piezoresistive force sensor (e.g., FlexiForce™ A101 or FlexiForce™ VS Shunt Mode Sensor by Tekscan Inc.®), capacitive or magnetic flex or force sensor, and the like. In these other embodiments, the flex sensors and may each change resistance or another value in the circuit between a voltage source and the comparator to be detected as force or flex is applied by the deflector 480.

Figure 5:
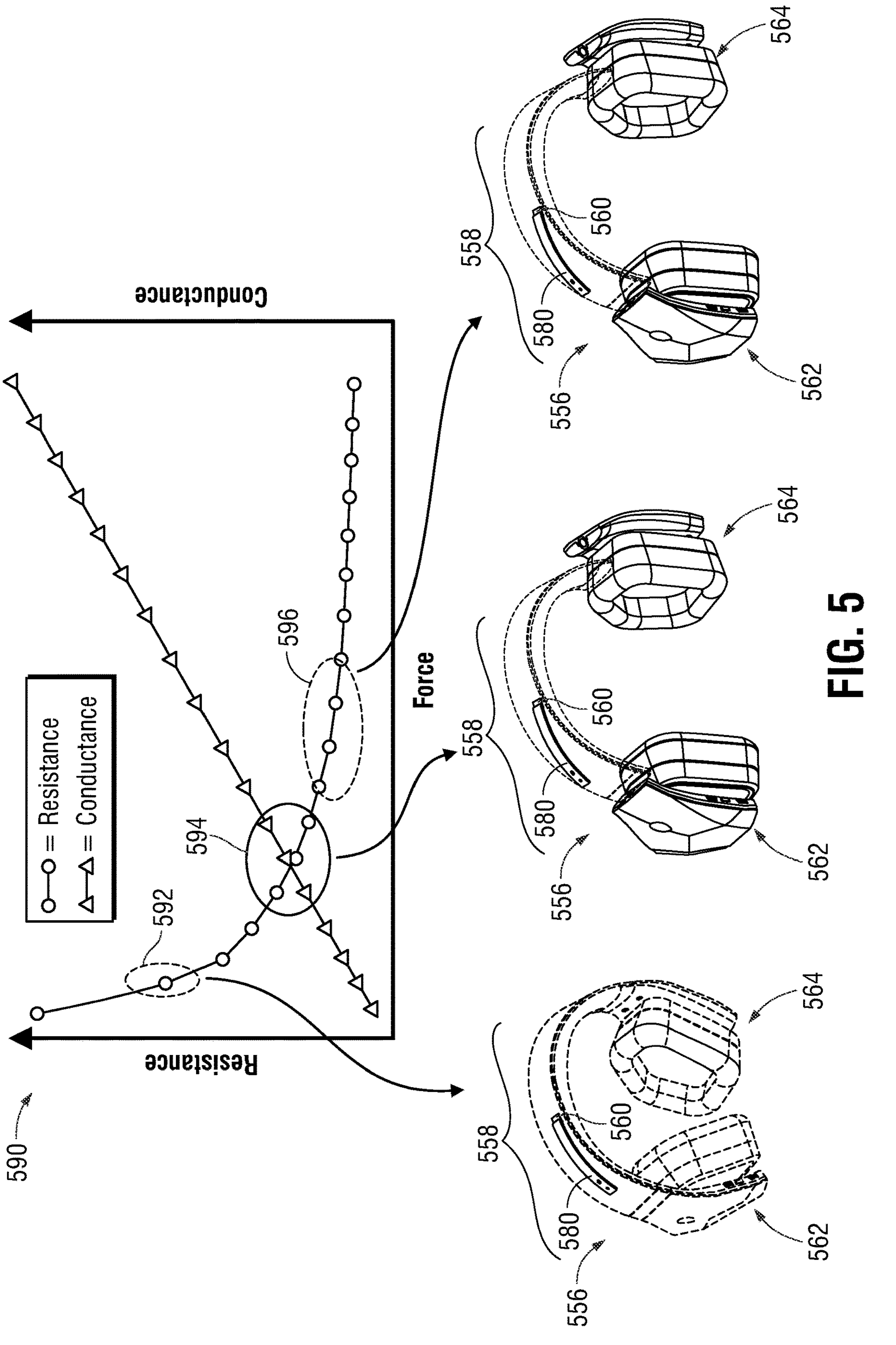
FIG. 5 is a graphic diagram of a headset in these states with a resistance/force graph indicating three resistance/ force points representative of a force/resistance states detected by a headband profile state sensor during three gesture states for a headband of the wireless headset according to an embodiment of the present disclosure.

FIG. 5 is a graphic diagram of a resistance/force graph 590 indicating three resistance/force value levels 592, 594, 596 representative of a force/resistance detected by a headband profile state sensor 560 during flexing of a headband through three example headband gesture states of a wireless headset 556 according to an embodiment of the present disclosure.

The first graph point force value level 592 indicates a point of high resistance at the headband profile state sensor 560. A headband gesture state 1 of the wireless headset 556 is also pictured showing that this high resistance at the headband profile state sensor 560 for a low force value level represents a scenario where the first earpiece 562 and second earpiece 564 have not been pried apart from each other and the headband 558 has not been flexed. As described herein, the headband profile state sensor 560 stays at a relatively high resistance when force is not applied to it by the deflector 580. Because the deflector 580 is merely holding the surface of the headband profile state sensor 560 in this scenario, the resistance remains relatively high and the sensed voltage or the comparator is lower than an initial reference dynamic threshold level. It is also appreciated that in this scenario, the wireless headset 556 is in an unworn headband gesture state 1. Here, the wireless headset 556 may be in a deep sleep state with the wireless headset MCU not active or the wireless headset may be in an intermediate sleep state in some embodiments. In either sleep state, for example, the wireless headset MCU may be waiting for either a user to pry the first earpiece 562 from the second earpiece 564 in order to place the wireless headset 556 on the user's head (e.g., indicative of a worn headband gesture state 2) or for a time period to end before the wireless headset 556 is placed in the sleep state thereby turning the MCU off and saving battery.

The second graph point 594 indicates a point with lower resistance level at the headband profile state sensor 560. A headband gesture state 2 of the wireless headset 556 is also pictured showing that the lower resistance level at the headband profile state sensor 560 results from a scenario where the first earpiece 562 and second earpiece 564 have been further pried apart or otherwise separated further from each other such that the headband 558 is in a flexed position while still being worn or as the user takes off the wireless headset 556. In an embodiment, this reflects a transition of headband gesture state between the unworn headband gesture state 1 and worn headband gesture state 2 where the user has placed the wireless headset 556 on the user's head. As shown in the resistance/force graph 590 at the second graph point 594, the resistance is lower than first graph point 592 which may indicate to the wireless headset MCU that the wireless headset 556 is in this transition of between headband gesture state 1 and headband gesture state 2 and which indicates that a user is putting on the headset 556 after having been in a sleep or off state. Again, the lower resistance across the headband profile state sensor 560 creates a relatively higher sensor voltage at the comparator of the headband state circuit such that, as the voltage exceeds a first or initial reference dynamic voltage ($V_{dym}$-L) provided to the comparator by the other elements of the headband state circuit. As such, the comparator output ($V_{out}$), provides a logic output of a transition in headband gesture state to the wireless headset MCU that is responding to this increased voltage from the headband profile state sensor 560 that has transitioned from a relatively low to a relatively high voltage as compared to the initial reference dynamic voltage at the comparator. The comparator operation results in a full voltage swing from a voltage that is relatively closer to 0 to a high voltage output when the sensor input voltage ($V_{in}$) that exceeds the initial reference dynamic voltage ($V_{dym}$-L). This provides or mimics an effective transition from a logic "0" to a logic "1" as detected at the wireless headset MCU. This logic transition is received at a GPIO input pin at the wireless headset MCU and is interpreted (e.g., a interrupt call back signal) by firmware executing thereon as a change from an unworn gesture state to a worn gesture state by the wireless headset MCU. This results in the wireless headset MCU not needing to engage in a constant polling read to check the state of the comparator and/or not needing to constantly read an ADC input or provide DAC output that may consume large amounts of power. Thus, the comparator of the headband state circuit serves as a hardware interrupt event source that does not require continuous monitoring and does not consume high power when it is being biased to operate in a saturation/cut-off zone thereby operating on low power consumption. Additionally, analog-to-digital polling reading sensor analog signals to detect headband gesture state changes are not used and are changed to comparator feed-GPIO interrupt events such that ADC polling actions are avoided thereby reducing the power consumption significantly.

Concurrently, the wireless headset MCU may direct a headset firmware and adaptive learning agent to continuously reprogram the headband state circuit to provide any adjustments to the first or initial reference dynamic voltage at the comparator based on the newly detected active state in the worn gesture state 2 of the wireless headset 556. Because the active state of the wireless headset 556 at the second graph point 594 is a transitioned to a worn headband gesture state or gesture state 2 of the wireless headset 556, the wireless headset MCU may interpret a new, higher output voltage ($V_{out}$) as the wireless headset 556 having been placed on the user's head and in a worn gesture state. The headset passive circuit may set the reference dynamic voltage at the comparator to an adjusted second higher reference dynamic threshold voltage ($V_{dym}$-H) such that when the comparator detects a voltage higher than this second high reference dynamic voltage from the headband profile state sensor 560 the MCU may interpret this as a transition at third graph point 596 to a further pried apart headband gesture state. At this point, the wireless headset MCU may also control audio output at the first earpiece 562 and second earpiece 564 allowing the user to hear the audio output sent wirelessly from the information handling system to the wireless headset 556 in the headband gesture state 2 or worn gesture state. Otherwise, where the second, higher reference dynamic voltage ($V_{dym}$-H) is exceeded, the audio input or output is not provided or muted in the headband gesture state 3 or further pried apart gesture state thereby conserving battery power until the user is actually able to hear the audio when the wireless headset 556 is in a worn gesture state again.

The third graph point 596 indicates a point of low resistance at the headband profile state sensor 560. This point of low resistance may be lower than the low resistance point at the second graph point 594. A headband gesture state 3 of the wireless headset 556 is pictured showing that a low resistance at the headband profile state sensor 560 and represents a scenario where the first earpiece 562 and second earpiece 564 have been pried further apart in a further pried apart headband gesture state 3 as discussed. This third graph point 596 indicates that the first earpiece 562 and second earpiece 564 have been pried apart from each other further than that reflected at the second graph point 594 with the headband 558, again, being in a further flexed position. Such a further pried apart gesture state 3 may be when a user wearing the wireless headset 556 pulls one or more earpieces 562 or 564 away from her ear to hear and outside sound such as another person in the room. The resistance/force graph 590 indicates this third graph point 596 as a very low resistance with the force placed on the headband profile state sensor 560 being very high. Here, because the wireless headset MCU, the passive circuit of the headband state circuit, or a headset firmware and adaptive learning agent had placed a second reference dynamic threshold voltage at the comparator to a second, higher reference dynamic threshold voltage ($V_{dym}$-H), the low resistance of the headband profile state sensor 560 in the further pried apart circumstance creates a higher sensor voltage received at the comparator to exceed this second, higher reference dynamic threshold voltage ($V_{dym}$-H) indicating a transition to a further pried apart headband gesture state 3 from a worn headband gesture state 2. This results in an output voltage ($V_{out}$) pulse from the comparator to the wireless headset MCU (e.g., at the GPIO pin) indicating that the second, higher reference dynamic threshold voltage ($V_{dym}$-H) has been exceeded such that this indicates to the MCU via a GPIO pin that the wireless headset 556 is in a further pried apart headband gesture state 3. At this point, the wireless headset MCU may control audio input or output to a microphone or earpieces 562 or 564 to mute any combination of audio input or output while the user has further pried away an earpiece 562 or 564. Otherwise, the audio input or output of the microphone or earpieces 562 or 564 is active as with the worn headband gesture state. Thus, the headband state circuit, wireless headset MCU, and headset firmware and adaptive learning agent work together to reduce power consumption at the wireless headset 556 thereby increasing the length of time the user may use the wireless headset 556 before replacing or recharging the battery by detecting headband gesture states 1, 2, or 3 transitions in embodiments herein. Additionally, as the wireless headset 556 is moved from one headband gesture state to another, the headset firmware and adaptive learning agent may continuously adjusting the various reference dynamic threshold voltage levels presented to the comparator so that the voltage across the headband profile state sensor 560 may be continuously compared in order to accurately detect when the user has moved the wireless headset 556 to transition among may headband gesture states (e.g., headband gesture state 1, headband gesture state 2, or headband gesture state 3) described in embodiments herein.

FIG. 6 is a circuit diagram of a headband state circuit 666 within a wireless headset according to an embodiment of the present disclosure. The headband state circuit 666 may be comprised of a first circuit portion 679, a second circuit portion 681, a third circuit portion 683, and comparators 659 and 690 operatively coupled to the headset MCU 668 with its integrated ADC/DAC 670 and the headset firmware and calibration adaptive learning agent 672. A headset PMU 676 with its headset battery 678 may be operatively coupled to the headset MCU 668 to provide power to the headset MCU 668 and the remaining portions of the headband state circuit 666 and control sleep and wake states.

The first circuit portion 679 of the headband state circuit 666 includes the headband profile state sensor 660 (designated as a $R_s$ in FIG. 6) with a first resistor ($R_1$) 661 coupled at a node. The first resistor ($R_1$) 661 is coupled to ground and is an adjustable resistor in some embodiments that may be adjusted to correct for shifts or other aspects. As described herein, the voltage across the headband profile state sensor 660, which may vary in resistance depending on flex force detected in example embodiments, is provided at a sensor input voltage ($V_{in}$) pin at the comparators 659 and 690. Initially, before the wireless headset is used by the user, the headset MCU 668 may be in a sleep state. However, the headset PMU 676 may provide a source voltage $V_{S1}$ to the headband profile state sensor 660 of the first circuit portion 679 as well as a second source voltage to the second circuit portion 681. These source voltages may be different with the first source voltage ($V_{S1}$) applied to the headband profile state sensor 660 being higher or lower than the second source voltage ($V_{S2}$) applied to the second circuit portion 681. As described herein, the second circuit portion 681 is a passive circuit that may provide an initial dynamic reference threshold voltage ($V_{dym}$) to the first comparator 659 and may adjust the threshold level provided to the first comparator 659 based on detected electrical drift of the headband profile state sensor that may be detected by the headset MCU using the headband state circuit 666. In an embodiment, the second circuit portion 681 is a wireless headset MCU off state, self-sustaining wake up circuit that may not rely on a DAC supply voltage from the wireless headset MCU to function and operates when the wireless headset is in an off state. When the second circuit portion 681 is in an MCU off state, all DAC functions of the wireless headset MCU are disabled. This allows the pMOSFET ($Q_s$) 675 of the second circuit portion 681 to serve as the source of the $V_{dym}$ to the comparator for transitioning from an unworn headband gesture state and a sleep state of the wireless headset to a detected wake state and to a worn headband gesture state at the wireless headset MCU 668. In an embodiment, the pMOSFET ($Q_s$) 675 is turned on or off via the wireless headset MCU 668 via a first GPIO pin ($GPIO_1$) upon the wireless headset MCU 668 waking up and the transition to the worn headband gesture state. The comparator 659, therefore, has a variable reference dynamic voltage ($V_{dym}$) from the second circuit portion 681 depending on adjustments to compare with a sensor input voltage source ($V_{in}$) from the headband profile state sensor 660 of the first sensor circuit portion 679. Initially, because the headband profile state sensor 660 has a high resistance when not flexed or when a force is not applied to it (depending on the type of sensor used), the sensor input voltage ($V_{in}$) at the comparator 659 is lower than the initial reference dynamic voltage ($V_{dym}$) set to detect transition to a worn headband gesture state form an unworn headband gesture state. Again, this provides for the headset MCU 668 to be placed in a deep sleep state while little to no power from the headset battery 678 is consumed during non-use of the wireless headset when sensor input voltage ($V_{in}$) remains low.

A gesture state transition event occurs when the comparator detects that the sensor input voltage source ($V_{in}$) across the headband profile state sensor 660 exceeds the first reference dynamic threshold voltage ($V_{dym}$). At this point, the user has pried apart the first earpiece from the second earpiece thereby reducing the resistance at the headband profile state sensor 660 and ($R_s$) increasing the input voltage ($V_{in}$) at the comparator 659. When $V_{in}$ exceeds the first reference dynamic threshold voltage ($V_{dym}$), the comparator 659 then sends an output voltage ($V_{out}$) to a GPIO input pin 669 at the headset MCU 668 causing a headset MCU 668 GPIO interrupt event for the headset MCU 668 to exit an active sleep state thereby waking or turning on the wireless headset and the headset MCU 668. This triggers the headset MCU 668 to disable the second circuit portion 681 and activate a third circuit portion 683 by GPIO logic control. Once the third circuit portion 683 is active, the wireless headset MCU 668 adjusts the DAC voltage ($V_{DAC}$) for the third circuit portion 683 to control the reference dynamic threshold voltage ($V_{dym}$) at the comparator 659 by feeding the appropriate voltage through the third circuit portion 683 and the transistor (e.g., pMOSFET $Q_n$) 677 for the adjusted, second reference dynamic threshold voltage ($V_{dym}$) at the negative input pin of the comparator 659. The wireless headset MCU 668 may execute firmware such as the headset firmware and calibration adaptive learning agent 672 to cause the appropriate voltage to be fed to the third circuit portion 683 (e.g., $V_{DAC}$) and to be applied to a second p-channel metal-oxide semiconductor (pMOSFET) ($Q_n$) 677 in order to supply the appropriate reference dynamic threshold voltage ($V_{dym}$) to the comparator 659 thereby allowing the wireless headset MCU 668, via the $GPIO_2$ pin, to control when the second pMOSFET ($Q_n$) 677 is on or off. The wireless headset MCU 688 may turn off the operation of the pMOSFET ($Q_s$) 675 and the second circuit portion 681 by the headset MCU 668 via the first GPIO pin ($GPIO_1$). Then the third threshold circuit portion 683 is used to provide the next second, higher reference dynamic voltage ($V_{dym}$) at the comparator 659 for a next transition headband gesture state event such as for a further pried apart gesture state. As such, this first reference dynamic threshold voltage ($V_{dym}$) is no longer used as the reference dynamic voltage used by the comparator 659 to compare against the input voltage ($V_{in}$) from the headband profile state sensor 660 and a second, higher reference dynamic voltage is used instead.

At this point, either the second circuit portion 681 or the third circuit portion 683 may set the reference dynamic voltage ($V_{dym}$) based on the compensations made to it by the execution firmware on the wireless headset MCU 668 and corrective adjustments of the headset firmware and calibration adaptive learning agent 672 by the headset MCU 668 to the gain via variable resistors $R_2$ 663 or $R_3$ 665 in example embodiments or to adjust gain at variable resistor $R_4$ 667. The headset firmware and adaptive learning agent 672, when executed by the headset MCU 668, compensates for drift experienced at the headband profile state sensor 660 by actively adjusting the bias gain of resistors $R_2$ 663 and $R_4$ 667 as well as $R_3$ 665 and even $R_1$ 661 if needed to provide a new reference dynamic threshold voltage at the comparator 659 so that the headband state circuit 666 is able to, for example, detect via a headband gesture state transition when the wireless headset is to wake from a sleep state in an unworn gesture state to an awake state in a worn gesture state or when other gesture states change. This allows the headband state circuit and headset MCU 668 to accommodate for the degradation or drifting that may occur at the headband profile state sensor 660 during use of the wireless headset as described herein.

As described, the third circuit portion 683 with its second pMOSFET ($Q_n$) 677 and third resistor ($R_3$) 665 may be operated to provide the new reference dynamic voltage ($V_{dym}$) to the comparator 659 via execution of the headset calibration firmware and adaptive learning agent 672 and provided a voltage source ($V_{DAC}$) from the headset battery 678 via a DAC output pin 673 at the headset MCU 668. A second GPIO pin 671 may be used to set the gate to turn on the second pMOSFET ($Q_n$) 677 by the headset calibration firmware and adaptive learning agent 672. As a consequence, the new reference dynamic voltage ($V_{dym}$) provided to the comparator 659 by the third circuit portion 683 may vary depending on the headband gesture state of the wireless headset that may inform the headset MCU 668 as to the gesture state of the wireless headset. For example, after the first reference dynamic voltage ($V_{dym}$) has been exceeded by the input voltage ($V_{in}$) from the headband profile state sensor 660, the headset MCU 668 has been woken up and transitioned the wireless headset to a worn headband gesture state. Then a further pried apart headband gesture state transition is detectable when the input voltage ($V_{in}$) from the headband profile state sensor 660 exceeds a new second, higher reference dynamic voltage ($V_{dym}$) provided by the third circuit portion 683 during an active state.

The headset MCU 668 detects that the wireless headset is transitioning to a worn gesture state when the first earpiece and second earpiece are separated apart from each other by the user to the extent that the resistance at the headband profile state sensor 660 creates a high enough input voltage ($V_{in}$) at the comparator 659 to exceed the initial reference dynamic threshold voltage ($V_{dym}$). When this occurs, the firmware or software of the headset firmware and calibration adaptive learning agent 672, executed by the headset MCU 668, reads the input voltage ($V_{in}$) via an ADC input pin at the ADC/DAC 670 to know the transition event to the worn headband gesture state is detected by the headband profile state sensor 660 and, therefore, the gesture state of the wireless headset may operate to allow the headset to provide or receive audio output or audio input. In another embodiment, the headset calibration firmware and adaptive learning agent 672 to set the second, high reference threshold voltage that, when triggered, indicates that the user has further pried the second earpiece away from the first earpiece in order to, for example, listen to an outside conversation or remove the headset needing to mute the microphone or earpieces of the wireless headset. This second, high reference voltage threshold ($V_{in}$-worn+delta=$V_{dym}$-H) includes the delta or difference between a historical input voltage at the comparator 659 necessary to indicate that the user has further pried the earpieces apart than was detected by the headset firmware and calibration adaptive learning agent 672. Again, a memory device associated with the headset MCU 668 may be used to reference these varying dynamic threshold voltage values ($V_{dym}$) so that, over time, a proper reference dynamic voltages ($V_{dym}$) may be used to detect the changing gesture states of the wireless headset. Additionally, a low third triggering voltage threshold ($V_{in}$-worn-delta=$V_{dym}$-L) may be set lower than the high second triggering voltage threshold and even lower than the initial triggering threshold level of $V_{dym}$ for transition between the unworn gesture state and the worn gesture state at a second negative pry detection comparator 690. The second comparator 690 outputs a voltage pulse to a third GPIO pin 692 indicative of the user removing the wireless headset and the flex relaxing as the earpieces are no longer distended from one another. The triggering of the second high reference threshold voltage or third low reference threshold voltage may pause any audio output provided by the earpieces and mute any audio input via a microphone as well until it is determined whether the wireless headset is being removed (e.g., input voltage drops lower than the third low threshold voltage) or is simply being pried open and returned to rest on the user's head (e.g., input voltage returns to the voltage detected during the worn headband gesture state above the initial threshold voltage). In an embodiment, where the input voltage ($V_{in}$) from the headband profile state sensor 660 at the comparator 659 drops below the third low threshold voltage, the headset MCU 668 may begin a process to place the wireless headset into a sleep state. When the sleep state is entered a timer may be initiated such that after a threshold period of time of the wireless headset being idle, the wireless headset is powered down by the headset MCU 668 to a sleep state. Still, because a source voltage is still applied to the headband profile state sensor 660 by the headset battery 678, the wireless headset may still be triggered awake if it exceeds an initial threshold voltage as described herein allowing for the headset MCU 668 to be woken and powered up again. In an embodiment, before the headset MCU 668 enters a sleep state, the headset MCU 668 may disable the third circuit portion 683 via a signal from the $GPIO_2$ pin 671 and turning off $V_{DAC}$ to the pMOSFET ($Q_n$) 677. Then while the headset MCU 668 is asleep, the supply voltage ($V_{S2}$) at the second circuit portion 681 will supply the appropriate voltage such that the first reference dynamic threshold voltage ($V_{dym}$) (a wake up voltage) via the pMOSFET ($Q_s$) 675 and the variable resistor network $R_2$ 663/variable resistor $R_4$ 667 at the negative input pin at the comparator 659.

FIG. 7A shows voltage headband gesture state change diagram of a headband profile state sensor output/time graph 757-A indicating changes to headband profile state sensor output voltage over time as the headband gesture states of a wireless headset change according to an embodiment of the present disclosure. FIG. 7B shows voltage headband gesture state change diagram of a headband profile state sensor output/time graph 757-B indicating changes to profile state sensor output voltage as determined by a comparator over time as the headband gesture states of a wireless headset change according to another embodiment of the present disclosure. FIG. 7C shows voltage headband gesture state change diagram of a headband profile state sensor output/time graph 757-C indicating changes to profile state sensor output voltage as determined by a second comparator over time as the headband gesture states of a wireless headset change according to yet another embodiment of the present disclosure. These headband profile state sensor output/time graphs 757-A, 757-B, and 757-C show a relationship between a first headband gesture state 749, a second headband gesture state 751, a third headband gesture state 753, and a fourth headband gesture state 755 (or return to the first headband gesture state) of the wireless headband as detected at a wireless headset MCU as described in embodiments herein.

In an embodiment, the first headband gesture state 749 may represent a sleep state where the wireless headset MCU is in a sleep state but not off. In FIG. 7A, this first headband gesture state 749 may change to a second headband gesture state 751 when a user pries open the wireless headset by separating the earpiece by a distance such as in preparation to don the wireless headset. As described herein, the resistance at the headband profile state sensor is reduced allowing for an increase in an input voltage ($V_{in}$) at the comparator. As the input voltage exceeds an initial dynamic threshold reference voltage provided at the first comparator an output voltage swing for a logic signal from the comparator is sent to the wireless headset MCU. As described herein, the output from the comparator ($V_{out}$) is biased to a saturation/cutoff voltage level to provide a logic "1" or logic "0" at the headset MCU as a digital signal to a GPIO input pin. For example, where the headband profile state sensor is flexed, the resistance is lower such that a high voltage is detected at the input voltage ($V_{in}$) at the comparator. This creates a voltage output ($V_{out}$) swing at the comparator to a logic high or, as detected by the headset MCU, a logic "1" indicating a transition from a first headband gesture state (e.g., unworn) to a second headband gesture state (e.g., worn) to the firmware executing on the wireless headset MCU. This binary output from the comparator function allows for comparator biasing which places the headband state circuit 266 and its comparator in a power saving zone to save power during operation of the headband state circuit compared to other options of monitoring with the wireless headset MCU. This logic input from the voltage output ($V_{out}$) swing received from the comparator wakes up the wireless headset MCU and initiates the wireless headset MCU to execute a headset firmware and calibration adaptive learning agent to determine the headband gesture state transition and to enable a second passive circuit portion to provide a new second, higher reference dynamic threshold voltage at the comparator for use in detecting when a third headband gesture state 753 has been reached. A third lower voltage threshold is used with a second comparator to determining if transition to a fourth headband gesture state 755 or if it returns to a second headband gesture state 751 with the output of the second comparator to the GPIO pin of the wireless headset MCU shown in FIG. 7C.

The second headband gesture state 751 may represent a worn gesture state. It is appreciated that the prying open of the headset may not be sufficient for the wireless headset MCU to detect that the wireless headset was ever opened enough to be placed in a worn headband gesture state. Instead, the first headband gesture state 749 may be maintained if the user does not pry open the wireless headset sufficiently thereby resulting in the sleep state (e.g., first headband gesture state 749) being maintained. When this happens the wireless headset MCU may initiate a countdown for a period of time and monitor for that time period to expire. If it does expire, the wireless headset may enter a deep sleep state or is turned off. However, if the input voltage from the headband profile state sensor exceeds the initial reference dynamic threshold voltage at the comparator instead as detected by the headband state circuit, the output voltage from the comparator indicates to the wireless headset MCU that the wireless headset is transitioning to a worn gesture state (e.g., second headband gesture state 751). At this point, the wireless headset MCU may direct that audio begin to be played in the earpieces to allow for audio output from the wirelessly-connected information handling system to be heard and any microphone to accept audio input.

At this point, the headset firmware and calibration adaptive learning agent may be executed by the wireless headset MCU to continuously update the reference dynamic threshold voltage at the comparator in order to detect other states such as a third headband gesture state 753 depicting a prying of the headset earpieces further away from the user's head in a further pried apart gesture state, and a fourth headband gesture state 755 indicating a return to an unworn gesture state and a sleep state due to the user taking the wireless headset off. In an embodiment, the headset firmware and calibration adaptive learning agent will direct that a source voltage be applied to the passive circuit portion of the headband state circuit that results in the detection of either a pausing of the audio at the third headband gesture state 753 or a placement of the wireless headbands back into an unworn gesture state and triggering countdown for a sleep state at a fourth headband gesture state 755. The headband state circuit uses the second, high reference dynamic threshold voltage at a first comparator or third, low reference dynamic threshold voltage at a second comparator for such determination. Where the input voltage from the headband profile state sensor exceeds the second, high reference dynamic threshold voltage ($V_{dym}$-H), the audio may be paused but the wireless headset may continue to be active waiting for a subsequent drop in voltage input at the comparator indicating that the user has placed the earpieces back on the user's head in the worn gesture state. Where the input voltage from the headband profile state sensor drops below the third, low reference dynamic threshold voltage at the second comparator, the MCU determines an indication of a fourth headband gesture state 755 transition that the user has removed the headset to an unworn gesture state.

This pausing but the wireless headset is represented in FIG. 7B where a signal to the wireless headset MCU indicates a second headband gesture state 751 transitions to a third headband gesture state 753. This third headband gesture state 753 is indicative of a user prying an earpiece further from a user's head to listen to an external conversation which causes the audio output at the earpieces to be paused. When the user places the earpiece back on the user's ear, a $V_{out}$ pulse to the wireless headset MCU (not shown) may indicate a return to the second headband gesture state 751. However, it is appreciated that the removal of any earpiece may be indicative of the complete removal of the headset as shown in FIG. 7C.

Indeed, where the input voltage from the headband profile state sensor falls below a low reference dynamic threshold voltage ($V_{dym}$-L) (e.g., falls to a fourth headband gesture state 755) via the second comparator, the wireless headset MCU may place the system or trigger a countdown to place the wireless headset into a sleep state. This is represented by FIG. 7C with the indication of a fourth headband gesture state 755 transition from either of the second headband gesture state 751 or the third headband gesture state 753. This is indicative that a user is removing the wireless headset. In an embodiment, the transition to the fourth headband gesture state 755 may initiate a timer that determines when a time threshold is reached and, when reached, places the wireless headset MCU into a sleep state as described herein.

FIG. 8 is a block flow diagram of a method 800 of detecting transitions among headband gesture states of a wireless headset according to an embodiment of the present disclosure. The method may begin with a headset PMU accessing its battery to provide a source voltage to a headband profile state sensor within a first circuit portion (e.g., 679, FIG. 6) that is a state sensor portion of a headband state circuit at block 805. As described herein the headband profile state sensor may be any type of sensor that can detect a flex change in the headband. For example, the headband profile state sensor includes a short flex sensor or bend sensor (e.g., a flex sensor sensing a deflection of substantially 2 inches (+/−0.4 inches), a long flex sensor or bend sensor (e.g., a flex sensor sensing deflection of approximately 5 inches+/−1 inch), a force resistive sensor, a piezoresistive force sensor (e.g., FlexiForce™ A101 or FlexiForce™ VS Shunt Mode Sensor by Tekscan Inc.®), capacitive, magnetic strain gauge, and the like. The flex sensors described in embodiments herein as an example of the headband profile state sensor may measure an amount of deflection or bending such that a resistance of the resistive sensor elements in the flex sensors is varied depending on the bending of the surface, in this case, of the headband of the wireless headset. The force resistive sensor described herein as an example embodiment of the headband profile state sensor generates a change in electrical resistance when an external force is applied to it. As such, both the force resistive sensor and flex sensors described herein as example embodiments of a headband profile state sensor may serve as a variable resistor element formed as part of a headband state circuit. The headband profile state sensor is used to detect the deflection of the headband and, therefore, detect a transition trigger among headband gesture states including transition among an un-worn gesture state, worn gesture state, and a further pried apart headband gesture state that is a change in distance between the first earpiece and second earpiece (described herein as a potential transition of the headband gesture state to a further pried apart headband gesture state then back to the worn gesture state or the unworn gesture state) of the wireless headset.

At this initial headband gesture state, which is an unworn gesture state at block 805, the wireless headset may be in an off state with the wireless headset MCU being powered down or in a sleep mode. As described herein, this conserves energy at the wireless headset battery with the wireless headset battery merely providing a source voltage to the headband profile state sensor and an electrically-coupled comparator.

At block 810, the method includes comparing the input voltage from the headband profile state sensor to an initial reference dynamic threshold voltage provided to the comparator from a second circuit portion (e.g., 681, FIG. 6) of the headband state circuit that is a passive circuit portion that sets the initial reference dynamic threshold voltage when the wireless headset is in a sleep mode at such a level to determine if the input voltage exceeds the initial reference dynamic threshold voltage if and when the headband is flexed enough to enter a wake mode. The headband profile state sensor serves as a variable resistive element within the headband state circuit and it detects when the gesture state of the wireless headset has changed such as with a user pulling earpieces apart to don the wireless headset. As the transition of a headband gesture state of the wireless headset changes due to a user prying a first earpiece away from a second earpiece, the change in resistance at the headband profile state sensor (e.g., the resistance drops) creates an increase in voltage at the input voltage of the comparator. At block 815, the method 800 proceeds to determine if the input voltage exceeds the initial reference dynamic threshold voltage. Where the input voltage does not exceed the initial reference dynamic threshold voltage, the method 800 returns to block 810 to continue monitoring for a transition of a headband gesture state as described herein.

Where the input voltage exceeds the initial reference dynamic threshold voltage at block 815, the method continues to block 820 where the output voltage from the comparator is pulsed to a GPIO pin to initiate placing a wireless headset MCU of the wireless headset in a wake state. In an embodiment, the wireless headset MCU includes an ADC/DAC that converts the analog from the headband profile state sensor into a digital signal that is interpreted, in another example embodiment, as a wake signal for the wireless headset MCU and may allow the sensor voltage input from the headband profile state sensor to be monitored for voltage levels.

At block 825, the wireless headset is in a wake states and the MCU executes a headset firmware and adaptive learning agent to direct the headset firmware and adaptive learning agent to disable the second circuit portion (e.g., 681, FIG. 6) of the headband state circuit. In an embodiment, this may be done by wireless headset MCU executing firmware such as the headset calibration adaptive learning agent to apply a logic "1" to the first p-channel metal oxide semiconductor field-effect transistor (pMOSFET) ($Q_s$) input gate to turn of the to turn off the first pMOSFET. The wireless headset MCU may turn off the operation of the pMOSFET ($Q_s$) and disable the resistor network formed by variable resistors $R_2$ 663 and variable resistor $R_4$ 667. The third circuit portion (e.g., 683, FIG. 6) is then used to provide the next reference dynamic voltage ($V_{dym}$) at the comparator for a next transition headband gesture state event. As such, this first reference dynamic threshold voltage ($V_{dym}$) provided by the second circuit portion (e.g., 681, FIG. 6) during a sleep mode is no longer used as the reference dynamic voltage used by the comparator to compare against the input voltage ($V_{in}$) from the headband profile state sensor. A second reference dynamic voltage from a third circuit portion (e.g., 683, FIG. 6) is used instead. By disabling this second circuit portion (e.g., 681, FIG. 6), the execution of the headset firmware and adaptive learning agent by the wireless headset MCU allows for the headset firmware and adaptive learning agent to continuously and dynamically set the third circuit portion (e.g., 683, FIG. 6) within the headband state circuit to produce subsequent second, higher dynamic reference threshold voltages ($V_{dym}$) at the first comparator in order to detect additional transitions of the headband gesture state and states of the wireless headset.

At block 835, the method 800 includes, with the headset now detected as having transitioned to a worn gesture state, the wireless headset MCU applies a source voltage to the third circuit portion (e.g., 683, FIG. 6) of the headband state circuit to provide the second reference dynamic threshold voltage at the comparator. A $V_{DAC}$ from the wireless headset MCU may provide a voltage source the second pMOSFET ($Q_n$) and a logic "1" signal from the headset MCU GPIO pin (e.g., 671, FIG. 6) will latch the second pMOSFET ($Q_n$) to an "ON" state and provide for voltage $V_{DAC}$ to be supplied through the second pMOSFET ($Q_n$) to the resistor network with resistors $R_3$ and $R_4$ for input into the negative input pin at the comparator. This voltage now serves as a second higher $V_{dym}$ to be compared to the voltage received from the headband profile state sensor in an example embodiment. By developing this second, higher reference dynamic threshold voltage at the comparator, the wireless headset MCU may monitor for a change from the worn headband gesture state where the user has put on the wireless headset to a further pried apart gesture state for pausing audio for example. At block 835, the headband state circuit allows for hardware monitoring offloading to the headset MCU firmware resources to monitor the gesture state change of the headset on a continuous basis.

The method 800 continues to block 840 such that while the wireless headset MCU has determined that the headset is in a worn headband gesture state the wireless headset MCU may begin to process audio data received or sent wirelessly from or to a wirelessly-coupled information handling system. The MCU may execute firmware whereby it presents audio output to the first and second earpieces of the wireless headset and may receive input audio at a microphone of the wireless headset thereby allowing a user to provide input to and receive output from the information handling system. Still further, at block 840, the comparator is continuously comparing input voltage from the headband profile state sensor to the second reference dynamic threshold voltage at the first comparator and a third, low reference dynamic threshold voltage at a second comparator as described below to monitor for a transition from the worn headband gesture state. The input voltage, when the wireless headset is worn, remains static and the first comparator output pulse indicated to the wireless headset MCU that the wireless headset was being worn. As such, the wireless headset may execute the firmware to set and provide the second reference dynamic threshold voltage at the first comparator as described above for detecting a further pried apart headband gesture state by providing the voltage source to the third circuit portion (e.g., 683, FIG. 6) and turning on the pMOSFET such that the adjustable variable resistors of a voltage divider at the third circuit arm of the headband state circuit provides for the second, higher reference dynamic threshold voltage at the first comparator.

It is appreciated that a headset firmware and adaptive learning agent may adjust for any electrical drift that may be present at the headband profile state sensor and that may have been caused by wear and tear over a period of time of use by the user with further adjustments the variable resistors of the voltage divider at the third circuit arm of the headband state circuit. It is further appreciated that a headset firmware and adaptive learning agent may also adjust for any electrical drift that may be present at the headband profile state sensor with further adjustments the variable resistors of the voltage divider at the second circuit arm that provides the initial reference dynamic threshold voltage during a sleep state of the wireless headset. Indeed, during use of the wireless headset, the electrical properties (e.g., resistive properties) of the headband profile state sensor may drift or change. This may be especially true as the user consistently bends the headband in order to put the wireless headset on the user's head or remove it therefrom. This action may degrade the headband profile state sensor over time resulting in this sensor output drift at the headband profile state sensor. The headset MCU, therefore, is operatively coupled to a headset firmware and adaptive learning agent to accommodate for this drift. The headset firmware and adaptive learning agent, when executed by the headset MCU, compensates for this drift by actively adjusting the bias gain and adjusting variable resistors of a voltage divider at the third circuit arm and the second circuit arm in the headband state circuit to adjust the reference dynamic threshold voltages (e.g., second reference dynamic threshold voltage) at the comparator so that the headband state circuit is able to, for example, detect when the wireless headset is to wake from a deep sleep state, when the headset transitions to a worn headband gesture state, and/or when the transitions occur to other headband gesture states such as to a further pried apart state/pause audio or to an unworn headband gesture state and sleep mode and vise-versa.

At block 845 the comparator determines if the sensor input voltage exceeds the second, higher reference dynamic threshold voltage. Where the input voltage does not exceed the second reference dynamic threshold voltage at block 845, the method returns to block 840 to monitor for state transitions as described herein. In this example embodiment, because the input voltage did not exceed the second reference dynamic threshold voltage, this may be indicative of the wireless headset remains worn on the user's head. Where, at block 845, the input voltage does exceed the second reference dynamic threshold voltage, the method 800 continues to block 850.

At block 850, because the input voltage at the comparator does exceed the second reference dynamic threshold voltage, this is indicative of the user further prying apart the first or second earpiece from each other thereby further reducing the resistance at the headband profile state sensor. Indeed, at block 850, the wireless headset MCU, having received a second output voltage pulse from the first comparator indicating that the sensor input voltage exceeded the second reference dynamic threshold voltage, determines that the wireless headset is in a further pried open headband gesture state. This causes the wireless headset MCU to execute the firmware code instructions to monitor for the input voltage falling below the second reference dynamic threshold voltage while also monitoring an additional third low reference dynamic threshold voltage at a second comparator. In an embodiment, the first comparator may now compare the sensor input voltage from the headband profile state sensor to the second high reference dynamic threshold voltage to determine transition back to a worn headband gesture state (e.g., detected output voltage from the first comparator drops below the second high reference dynamic threshold voltage but does not drop below a third low reference dynamic threshold voltage). The headset may also compare the sensor input voltage from the headband profile state sensor to a third low reference dynamic threshold voltage at a second negative comparator. The third low reference dynamic threshold voltage is generated by the headband state circuit for the second comparator, whose output voltage pulse is operatively coupled to another GPIO pin on the headset MCU, and compares the sensor input voltage $V_{in}$ from the headband profile state sensor to the third low reference dynamic threshold voltage. Because the state of the wireless headset in the further pried apart headband gesture state is an intermediate gesture state of the wireless headset (e.g., intermediate to a worn gesture state or an unworn gesture state), the second reference dynamic voltage threshold at the comparator is a high reference dynamic voltage ($V_{dym}$-H) such that when the comparator detects a $V_{in}$ voltage that exceeds this second high reference dynamic voltage from the headband profile state sensor, the wireless headset MCU may interpret this as the wireless headset being in a temporary further pried apart gesture state. Where the first comparator detects a $V_{in}$ voltage that does not exceed this second high reference dynamic voltage, this may be indicative of the headset having been placed back in the worn headband gesture state. Additionally, where the input voltage from the headband profile state sensor falls below the third low reference dynamic threshold voltage ($V_{dym}$-L) as detected at the second comparator, this may indicate to the wireless headset MCU that the headset is transitioning to an unworn headband gesture state and that may initiate placing the headset system into a sleep state.

At block 855, the comparator determines if the input voltage still exceeds or drops below the second high reference dynamic threshold voltage or drops below the third low reference dynamic threshold voltage. Where the input voltage still exceeds the second high reference dynamic threshold voltage, the method 800 continues to block 860 with the wireless headset MCU turning off the audio input or output provided at the microphone or the earpieces thereby conserving battery power and muting the audio when the user further pries apart the earpieces to listen to an outside conversation, for example. This audio input and output may be muted until the user is actually able to use the audio when the wireless headset is worn again (e.g., the earpieces are placed back over the user's ears in a worn gesture state). Thus, the headband state circuit, wireless headset MCU, and headset firmware and adaptive learning agent work together to reduce power consumption at the wireless headset thereby increasing the length of time the user may use the wireless headset before replacing or recharging the battery. Upon determining that the wireless headset is still in a further pried apart gesture state, the method 800 may then return back to block 850 as described herein to monitor the sensor input voltage from the headband profile state sensor for comparison again via the first or second comparator.

At block 855 where the first comparator detects a $V_{in}$ sensor voltage that no longer exceeds this second high reference dynamic voltage but does not drop below the third low reference dynamic threshold voltage at the second comparator, the method 800 returns to block 840. Again, at block 840, the wireless headset is detected as being in a worn gesture state with audio being turned back on at the earpieces and the microphone being turned on as well. This allows a user to, when the earpieces are pried apart, pause the audio, and disable the microphone once again if necessary until the earpieces have been, again later, placed over the user's ears. Upon determining that the wireless headset has returned to a worn gesture state, the method 800 may then return back to block 850 as described herein to monitor the sensor input voltage from the headband profile state sensor for comparison again via the first or second comparator.

Where the input voltage drops below the third low reference dynamic threshold voltage at the second comparator the method 800 continues to block 865 with the audio again being turned off at the earpieces or microphone. However, at this point the wireless headset MCU has detected that the user has removed the wireless headset and the wireless headset is now in an unworn headband gesture state. As such, the method proceeds to block 870 with initiating a sleep state at the wireless headset with the wireless headset MCU or with initiating one or more idle countdowns. This idle countdown may be initiated so as to give a user time to put the wireless headset on (e.g., worn gesture state) or, alternatively, allow the wireless headset to enter sleep mode, shut down or otherwise turn off. Therefore, at block 875, the wireless headset MCU determines whether the idle countdown has expired. Where it has not, the method 800 returns to block 870. Meanwhile, at any time, the first comparator may still be comparing the sensor input voltage $V_{in}$ to the initial reference dynamic threshold voltage with the second arm of the headband state circuit being reinitiated by the wireless headset MCU for providing the initial reference dynamic threshold voltage for the first comparator. Where the idle countdown has expired at block 870 without the user prying the first earpiece from the second earpiece in order to wear the wireless headset, the method 800 continues to block 8880 with the wireless headset MCU entering a sleep state or shutting down. At this point, the method 800 may end. This may lead to the wireless headset being put in to sleep mode or tuned off where the idle countdown at blocks 875 and 880 is expired. The method 800, therefor, allows a user to reduce the amount of power consumption of the battery within the wireless headset and extend the time that a user may operate the wireless headset between recharging or replacement of the battery. Where alkaline batteries are used, the systems and methods described herein also reduce the number of alkaline batteries consumed by the user thereby reducing the potential waste and environmental issues associated with disposing of these batteries.

The blocks and steps of the flow diagrams of FIG. 8 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless headset wirelessly coupled to an information handling system to receive and send input and output data comprising:

a headset microcontroller unit (MCU);

a first earpiece and a second earpiece to provide audio output to a user;

a flexible headband coupled to the first earpiece and second earpiece, the flexible headband including a headband profile state sensor, the headband profile state sensor to detect when the wireless headset is in an un-worn headband gesture state and a worn headband gesture state by detecting a change in resistance value when a distance between the first earpiece and the second earpiece is increased and decreased by flexing the headband;

a headband state circuit comprising a comparator and the headset MCU to detect a change in the resistance at the headband profile state sensor via a sensor input voltage; and the headset MCU to determine a transition between the headset un-worn headband gesture state and the headset worn headband gesture state to activate the wireless headset.

2. The wireless headset of claim 1 further comprising:

a first circuit portion of the headband state circuit comprising the headband profile state sensor to generate a sensor input voltage from the first circuit portion to the comparator for comparison with a first reference dynamic threshold voltage provided at the comparator and the first reference dynamic threshold voltage based on the wireless headset being in the unworn headband gesture state.

3. The wireless headset of claim 1 further comprising:

a first circuit portion of the headband state circuit to, with control by a p-channel metal oxide semiconductor first field-effect transistor (pMOSFET), provide a first reference dynamic threshold voltage to the comparator, where the comparator monitors for the first reference dynamic threshold voltage being met by the sensor input voltage to the comparator indicting a change from the un-worn headband gesture state to the worn headband gesture state.

4. The wireless headset of claim 3 wherein the first circuit portion of the headband state circuit is disabled when the first voltage threshold is met and the headset MCU operatively coupled to the first portion of the headband state circuit turns off the first pMOSFET.

5. The wireless headset of claim 3 further comprising:

a second circuit portion of the headband state circuit to provide a second reference dynamic threshold voltage at the comparator and the second reference dynamic threshold voltage based on the wireless headset being in the worn headband gesture state and used to detect a second transition the worn headband gesture state and a further pried apart headband gesture state to automatically trigger operation controls to mute audio output pursuant to the execution of the headset firmware by the headset MCU.

6. The wireless headset of claim 3, further comprising:

the headset MCU executing code instructions of a headband calibration adaptive learning agent to adjust the first reference dynamic threshold voltage to accommodate drift in operation of the headband profile state sensor via adjustments to a variable resistor in a voltage divider in the first circuit portion of the headband state circuit.

7. The wireless headset of claim 1 further comprising:

the headset MCU including a digital-to-analog (DAC) converter output pin to provide the headband state circuit with a DAC voltage control signal to enable a pMOSFET to turn on to provide an adjusted reference dynamic threshold voltage at the comparator based on wireless headset being in an active state and the worn headband gesture state to detect a transition to a third headband gesture state by the comparator.

8. The wireless headset of claim 1 further comprising:

the headband state circuit comprising a plurality of variable resistors to be digitally adjusted by the headset MCU to provide adjustments to a reference dynamic threshold voltage provided at the comparator to adjust for drift in operation of the headband profile state sensor.

9. A method of detecting a headband gesture state of a wireless headset, comprising:

passively detecting, with a headband state circuit comprising a comparator comparing a sensor input voltage based on a change in a resistance at a headband profile state sensor formed into a flexible headband of the wireless headset with a first reference dynamic threshold voltage, a transition from an unworn headband gesture state to a worn headband gesture state at a general-purpose input/output (GPIO) pin of a headset microcontroller unit (MCU) of the wireless headset when a user flexes the flexible headband by separating a first earpiece from a second earpiece beyond a threshold distance;

waking the headset MCU from a sleep state; and executing, with the headset MCU, code instructions of headset firmware to enable audio output via the first earpiece and the second earpiece upon the headset MCU determining the wireless headset has transitioned to the worn headband gesture state.

10. The method of claim 9 further comprising:

comparing, with a first circuit portion of the headband state circuit comprising the headband profile state sensor and the comparator, the sensor input voltage with the first reference dynamic threshold voltage provided from a second circuit portion of the headband state circuit controlled by a first p-channel metal oxide semiconductor field effect transistor (pMOSFET) when the wireless headset is in a sleep state.

11. The method of claim 9 further comprising:

comparing, with a first circuit portion of the headband state circuit comprising the headband profile state sensor and the comparator, the sensor input voltage with a second reference dynamic threshold voltage provided from a third circuit portion of the headband state circuit controlled by a second pMOSFET when the wireless headset is in the worn headband gesture state.

12. The method of claim 9 further comprising:

passively detecting, with the headband state circuit including a second comparator the sensor input voltage based on a change in the resistance at the headband profile state sensor formed into a flexible headband of the wireless headset with a second, low reference dynamic threshold voltage, transition from the worn headband gesture state back to the unworn headband gesture state at the headset MCU of the wireless headset when the user relaxes flex in the flexible headband by releasing separation of the first earpiece from the second earpiece; and executing, with the headset MCU, code instructions of headset firmware to mute audio output via the first earpiece and the second earpiece and triggering initialization of a sleep mode upon the headset MCU determining the wireless headset has transitioned back to the unworn headband gesture state.

13. The method of claim 10 further comprising:

adjusting for drift in operation of the headband profile state sensor formed into the flexible headband of the wireless headset with adjustment in the first reference dynamic threshold voltage with execution of code instructions of a calibration adaptive learning agent by the headset MCU to adjust gain in the second circuit portion of the headband state circuit controlled by a first p-channel metal oxide semiconductor field effect transistor (pMOSFET) when the wireless headset is in a sleep state.

14. The method of claim 11 further comprising:

providing the headband state circuit with a DAC voltage signal via a digital-to-analog converter output pin of the headset MCU to enable the second pMOSFET operatively to adjust the first reference dynamic threshold voltage to the second reference dynamic threshold voltage at the comparator to detect transition from the worn headband gesture state to the further pried apart headband gesture state.

15. The method of claim 9 wherein the wireless headset is in a sleep state in the unworn headband gesture state and the headset MCU receives a wake signal at the GPIO pin from the comparator indicative of the user increasing the distance between the first earpiece and the second earpiece to don the wireless headset.

16. A wireless headset wirelessly coupled to an information handling system to receive and send input and output data comprising:

a headset microcontroller unit (MCU);

a first earpiece and a second earpiece to provide audio output to a user;

a flexible headband coupled to the earpiece, the flexible headband including a headband profile state sensor where the headband profile state sensor detect when the wireless headset is in an un-worn headband gesture state and a worn headband gesture state by detecting a change in resistance value via a change in sensor input voltage when a distance between the first earpiece and the second earpiece is increased thereby flexing the headband;

a headband state circuit comprising a comparator to detect the change in the resistance at the headband profile state sensor from the sensor input voltage at the comparator exceeding an initial reference dynamic threshold voltage; and the headset MCU to determine from the detected change in the resistance at the headband profile state sensor that the wireless headset has transitioned from an unworn headband gesture state to a worn headband gesture state to wake the wireless headset from a sleep state.

17. The information handling system of claim 16 further comprising:

a first portion of the headband state circuit to provide the initial reference dynamic threshold voltage to the comparator and controlled by a first p-channel metal oxide semiconductor field effect transistor p (MOSFET) when the wireless headset is in a sleep state and in the unworn headband gesture state.

18. The information handling system of claim 16 further comprising:

the headset MCU to turn on a second pMOSFET at a second portion of the headband state circuit to provide a second reference dynamic threshold voltage to the comparator when the sensor input voltage exceeds the initial reference dynamic threshold voltage at the comparator indicating that the wireless headset has transitioned to the worn headband gesture state.

19. The information handling system of claim 16 further comprising:

the headband state circuit comprising the comparator to detect the change in the resistance at the headband profile state sensor from the sensor input voltage at the comparator exceeding a second reference dynamic threshold voltage; and the headset MCU to determine from the detected change in the resistance at the headband profile state sensor from the sensor input voltage exceeding the second reference dynamic threshold voltage that the wireless headset has transitioned from the worn headband gesture state to a further pried apart headband gesture state to mute the audio output at the first earpiece and the second earpiece.

20. The information handling system of claim 16 further comprising:

the headband state circuit comprising a second comparator to detect the change in the resistance at the headband profile state sensor from the sensor input voltage at the second comparator falling below a low reference dynamic threshold voltage; and the headset MCU to determine from the detected change in the resistance at the headband profile state sensor from the sensor input voltage falling below the low reference dynamic threshold voltage that the wireless headset has transitioned from the worn headband gesture state back to the unworn headband gesture state to initialize a countdown for a sleep mode for the wireless headset.

* * * * *